US012482514B2

(12) United States Patent
Liu et al.

(10) Patent No.: US 12,482,514 B2
(45) Date of Patent: Nov. 25, 2025

(54) APPARATUS, METHOD AND SYSTEM TO REDUCE MEMORY WINDOW LATENCY AND READ DISTURB IN A MEMORY DEVICE FOR MEMORY OPERATIONS

(71) Applicant: Intel Corporation, Santa Clara, CA (US)

(72) Inventors: Lu Liu, Milpitas, CA (US); Hemant P. Rao, Albuquerque, NM (US); Phoebe P. Yeoh, Albuquerque, NM (US); Raymond Zeng, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 764 days.

(21) Appl. No.: 17/679,971

(22) Filed: Feb. 24, 2022

(65) Prior Publication Data

US 2023/0267988 A1   Aug. 24, 2023

(51) Int. Cl.
| | |
|---|---|
| *G11C 11/408* | (2006.01) |
| *G11C 11/4072* | (2006.01) |
| *G11C 11/4074* | (2006.01) |
| *G11C 11/4076* | (2006.01) |
| *G11C 11/4094* | (2006.01) |
| *G11C 11/4096* | (2006.01) |

(52) U.S. Cl.
CPC ...... *G11C 11/4085* (2013.01); *G11C 11/4072* (2013.01); *G11C 11/4074* (2013.01); *G11C 11/4076* (2013.01); *G11C 11/4094* (2013.01); *G11C 11/4096* (2013.01)

(58) Field of Classification Search
CPC .......... G11C 11/4076; G11C 11/4094; G11C 11/4096; G11C 2213/76; G11C 11/5678; G11C 2213/71; G11C 13/003; G11C 2207/2272; G11C 2213/77; G11C 7/08; G11C 13/0004; G11C 13/004; G11C 13/0061; G11C 13/0069; G11C 7/18; G11C 5/025; H10B 63/10; H10B 63/84; H10B 63/24
USPC .................................................... 365/185.13
See application file for complete search history.

(56) References Cited

U.S. PATENT DOCUMENTS 9,583,187 B2    2/2017 Rangan et al.
2019/0180831 A1*  6/2019 Shukla ................. G11C 16/26

\* cited by examiner

*Primary Examiner* — Huan Hoang
(74) *Attorney, Agent, or Firm* — Alliance IP, LLC

(57) ABSTRACT

A method, apparatus and system. The apparatus includes one or more processors to: determine that a memory operation including one of a write operation or a read operation is to be implemented on a memory cell of a memory array, the memory operation having a duration equal to a latency window and being based on a voltage change across the memory cell equal to a target memory window; and in response to a determination that the memory operation is to be implemented, cause, during the latency window, an application of a current pulse amplitude profile to the memory cell, wherein the current pulse amplitude profile decreases progressively, encompassing at least four different current pulse amplitudes, the at least four different current pulse amplitudes including a highest current pulse amplitude and a lowest current pulse amplitude.

25 Claims, 9 Drawing Sheets

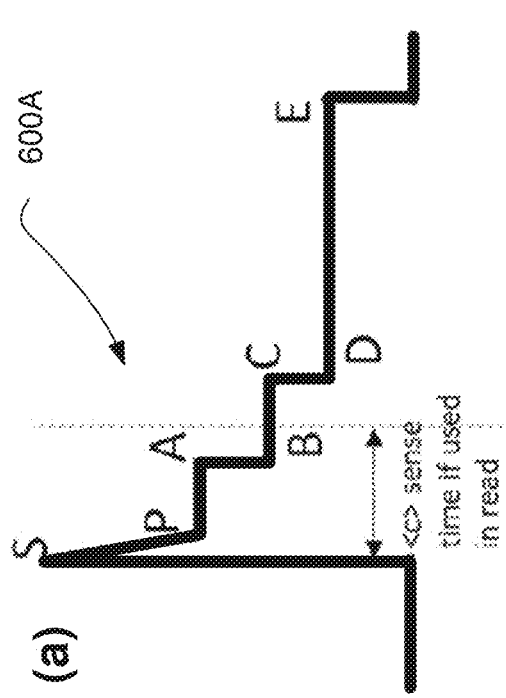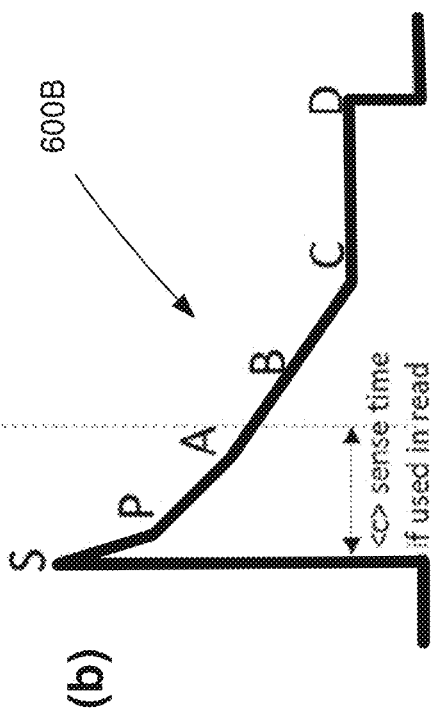
FIG. 6A
FIG. 6B

APPARATUS, METHOD AND SYSTEM TO REDUCE MEMORY WINDOW LATENCY AND READ DISTURB IN A MEMORY DEVICE FOR MEMORY OPERATIONS

FIELD

The present disclosure relates in general to the field of computer development, and more specifically, to performing write and read operations across a memory cell of a memory array in a three-dimensional (3D) memory architecture.

BACKGROUND

Existing solutions for memory operations on memory cells of 3D memory architectures use a square current pulse holding a specified single current level (such as about 30 to about 60 uA) for set and read setback operation. The required programming time or latency for existing solutions can be very long (>125 ns) to achieve a desired memory window (>300 mV), or the selector device can disadvantageously remain stuck at a relatively high set threshold voltage (Vt), with a relatively low memory (<200 mV). Improved mechanisms are needed for memory operations on memory cells of 3D memory architectures.

BRIEF DESCRIPTION OF THE DRAWINGS

FIG. 6A shows a graph plotting selector device current against time, and associated data, based on a step-wise current reduction algorithm according to one embodiment.

FIG. 6B shows a graph plotting selector device current against time, and associated data, based on a ramp down current reduction algorithm according to one embodiment.

Like reference numbers and designations in the various drawings indicate like elements.

DETAILED DESCRIPTION

Figure 1:
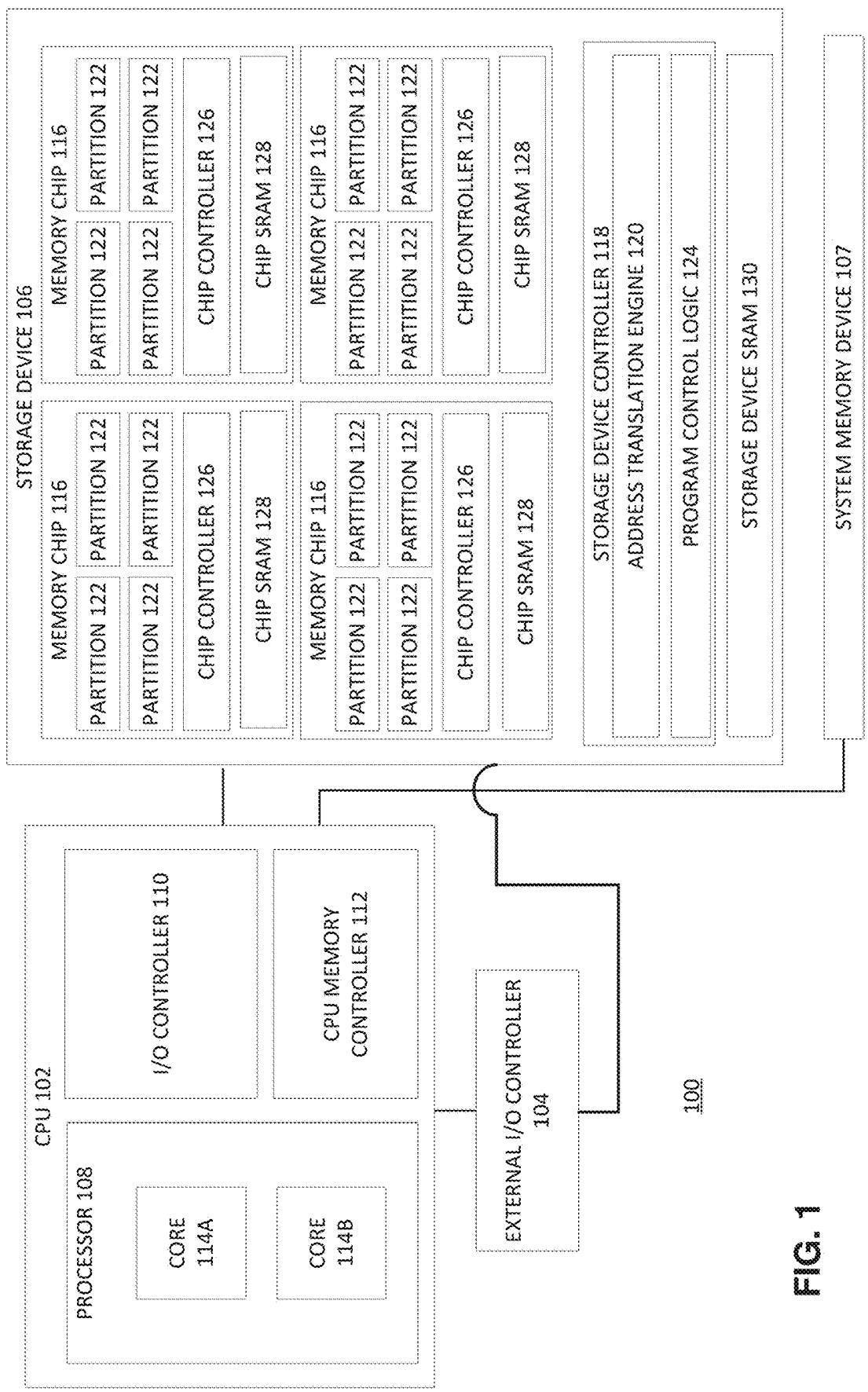
FIG. 1 is a schematic illustration of a block diagram of components of a computer system according to some embodiments.

Some embodiments provide a low latency technique for memory cells in a memory array, such as for memory cells with chalcogenide-based selectors. Some embodiments are applicable to memory operations including write and read operations. Some embodiments are applicable, in a single level cell (SLC) architecture, to a write operation on a set cell at a low threshold voltage (Vt) state, and to a read operation on a cell in a set state or a rest state, for example a setback read operation. Some embodiments are applicable, in a multi-level cell (MLC) architecture, to a write operation on a cell at an intermediate state (i.e. "MLC state," a state with Vt below the reset state), and to a read operation on a cell in a MLC state or a reset state, for example a setback read operation. Some embodiments are based on the underlying physics of threshold voltage (Vt) modulation (electromigration, thermal diffusion and viscosity) in a chalcogenide selector device of a memory cell. Some embodiments involve at least two types of algorithms, which both involve applying a current pulse across the cell for efficient memory operations as described above. Embodiments are applicable to both a single level cell (SLC) cross-point memory cell, or multiple level cell (MLC) cross-point memory cell containing both phase change memory (PCM) and selector device. These algorithms improve write/read latency, window and MLC read disturb.

Existing solutions use a square current pulse holding a specified single current level (such as about 30 to about 60 uA) for set and read setback operation. With a square pulse, the current level choice must sacrifice either latency or target memory window (the change in voltage needed to go from one state of a memory cell to a different state of the memory cell). If using a low current level (such as about 30 uA, leading to Joule heating of about 1.2 to about 1.4 times the glass transition temperature of the material of the selector device), the required programming time or latency is very long (>125 ns) to achieve a target memory window (>300 mV). If using a high current level (such as about 60 to about 70 uA, bringing about a Joule heating close to a melt temperature of the selector material), the selector device tends to disadvantageously get stuck at a relatively high set Vt, and the target memory window is much lower (<200 mV).

Some embodiments start the current pulse through a memory cell from a current level close to a melt current of the selector material, for example where the selector material includes a chalcogenide. For example, the start current level may be at about 60 uA, with associated Joule heating close to about 1.7 to about 2 times a glass transition temperature (Tg) of the selector material (i.e. material of the selector device), such as glass. Then, some embodiments reduce the current pulse, either through a step-down or ramp-down regime, to a lower current level, for example to a ratio of Tg, for example to about 30 uA, with an associated Joule heating from about 1.2 to about 1.4 times Tg.

Advantageously, some embodiments improve a selector device's write set and read setback performance. As compared with best case scenarios of previous solutions, some embodiments have shown advantages including: (1) reduced write set and read-setback latency by about 1.5 to about 2; (2) about 15% about 25% gain in memory window (a voltage differential reached within a same time budget was observed to be about 15% to about 25% higher as compared with a voltage differential across a same cell subjected to a memory operation method of the prior art) with the same total time budge/latency; (3) in a MLC application, over a 4 times reduction in read disturb bit error rate by suppressing unintended PCM crystallization.

A mechanism of some embodiments that makes the above advantages possible includes an interruption in the nucleation process of the selector material and oscillate nuclei sizes at each read operation. At the lower current pulse amplitudes, subcritical nuclei sizes are formed, while at higher current pulse amplitudes, the subcritical nuclei sizes shrink. This is contrary to the prior art mechanisms where, by virtue of the square pulse, subcritical nuclei sizes are formed during a read operation and continue growing with each read operation to critical nuclei sizes.

Although the drawings depict particular computer systems, the concepts of various embodiments are applicable to any suitable computer systems. Examples of systems in which teachings of the present disclosure may be used include desktop computer systems, server computer systems, storage systems, handheld devices, tablets, other thin notebooks, system on a chip (SOC) devices, and embedded applications. Some examples of handheld devices include cellular phones, digital cameras, media players, personal digital assistants (PDAs), and handheld PCs. Embedded applications may include microcontrollers, digital signal processors (DSPs), SOCs, network computers (NetPCs), set-top boxes, network hubs, wide area networks (WANs) switches, or any other system that can perform the functions and operations taught below. Various embodiments of the present disclosure may be used in any suitable computing environment, such as a personal computing device, a server, a mainframe, a cloud computing service provider infrastructure, a datacenter, a communications service provider infrastructure (e.g., one or more portions of an Evolved Packet Core), or other environment comprising one or more computing devices.

FIG. 1 illustrates a block diagram of components of a computer system 100 in accordance with some embodiments. System 100 includes a central processing unit (CPU) 102 coupled to an external input/output (I/O) controller 104, a storage device 106 such as a solid state drive (SSD), and system memory device 107. During operation, data may be transferred between a storage device 106 and/or system memory device 107 and the CPU 102. In various embodiments, particular memory access operations (e.g., read and write operations) involving a storage device 106 or system memory device 107 may be issued by an operating system and/or other software applications executed by processor 108. In various embodiments, a storage device 106 may include a storage device controller 118 and one or more memory chips 116 that each comprise any suitable number of memory partitions 122.

In various embodiments, a memory partition may include a 3D crosspoint memory array. In some embodiments, a 3D crosspoint memory array may comprise a transistor-less (i.e., at least with respect to the data storage elements of the memory) stackable crosspoint architecture in which memory cells sit at the intersection of row address lines and column address lines arranged in a grid.

During a read operation, a differential bias sometimes referred to as a demarcation voltage (VDM) may be applied across the terminals of the memory cell and the state of the memory cell may be sensed based on the reaction of the memory cell to the applied bias. For example, the memory cell may either go into a conductive ON state (logic one) or remain in a weakly conductive OFF state (logic zero). The applied voltage at which a memory cell transitions from being sensed as a logic one to being sensed as a logic zero may be termed a threshold voltage of the memory cell. Thus, as an example, when the VDM is higher than the threshold voltage of the memory cell, the memory cell may be sensed as storing a logic one and when the VDM is lower than the threshold voltage of the memory cell, the memory cell may be sensed as storing a logic zero.

CPU 102 comprises a processor 108, such as a microprocessor, an embedded processor, a DSP, a network processor, a handheld processor, an application processor, a co-processor, an SOC, or other device to execute code (i.e., software instructions). Processor 108, in the depicted embodiment, includes two processing elements (cores 114A and 114B in the depicted embodiment), which may include asymmetric processing elements or symmetric processing elements. However, a processor may include any number of processing elements that may be symmetric or asymmetric. CPU 102 may be referred to herein as a host computing device (though a host computing device may be any suitable computing device operable to issue memory access commands to a storage device 106).

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core 114 (e.g., 114A or 114B) may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

In various embodiments, the processing elements may also include one or more arithmetic logic units (ALUs), floating point units (FPUs), caches, instruction pipelines, interrupt handling hardware, registers, or other hardware to facilitate the operations of the processing elements.

I/O controller 110 is an integrated I/O controller that includes logic for communicating data between CPU 102 and I/O devices, which may refer to any suitable logic capable of transferring data to and/or receiving data from an electronic system, such as CPU 102. For example, an I/O device may comprise an audio/video (A/V) device controller such as a graphics accelerator or audio controller; a data storage device controller, such as a flash memory device, magnetic storage disk, or optical storage disk controller; a wireless transceiver; a network processor; a network interface controller; or a controller for another input device such as a monitor, printer, mouse, keyboard, or scanner; or other suitable device. In a particular embodiment, an I/O device may comprise storage device controller 118 of storage device 106 coupled to the CPU 102 through I/O controller 110.

An I/O device may communicate with the I/O controller 110 of the CPU 102 using any suitable signaling protocol, such as peripheral component interconnect (PCI), PCI Express (PCIe), Universal Serial Bus (USB), Serial Attached SCSI (SAS), Serial ATA (SATA), Fibre Channel (FC), IEEE 802.3, IEEE 802.11, or other current or future signaling protocol. In particular embodiments, I/O controller 110 and the underlying I/O device may communicate data and commands in accordance with a logical device interface specification such as Non-Volatile Memory Express (NVMe) (e.g., as described by one or more of the specifications available at www.nvmexpress.org/specifications/) or Advanced Host Controller Interface (AHCI) (e.g., as described by one or more AHCI specifications such as Serial ATA AHCI: Specification, Rev. 1.3.1 available at http://www.intel.com/content/www/us/en/io/serial-ata/serial-ata-ahci-spec-rev1-3-1.html). In various embodiments, I/O devices coupled to the I/O controller may be located off-chip (i.e., not on the same chip as CPU 102) or may be integrated on the same chip as the CPU 102.

CPU memory controller 112 is an integrated memory controller that includes logic to control the flow of data going to and from one or more system memory devices 107. CPU memory controller 112 may include logic operable to read from a system memory device 107, write to a system memory device 107, or to request other operations from a system memory device 107. In various embodiments, CPU memory controller 112 may receive write requests from cores 114 and/or I/O controller 110 and may provide data specified in these requests to a system memory device 107 for storage therein. CPU memory controller 112 may also read data from a system memory device 107 and provide the read data to I/O controller 110 or a core 114. During operation, CPU memory controller 112 may issue commands including one or more addresses of the system memory device 107 in order to read data from or write data to memory (or to perform other operations). In some embodiments, CPU memory controller 112 may be implemented on the same chip as CPU 102, whereas in other embodiments, CPU memory controller 112 may be implemented on a different chip than that of CPU 102. I/O controller 110 may perform similar operations with respect to one or more storage devices 106.

The CPU 102 may also be coupled to one or more other I/O devices through external I/O controller 104. In a particular embodiment, external I/O controller 104 may couple a storage device 106 to the CPU 102. External I/O controller 104 may include logic to manage the flow of data between one or more CPUs 102 and I/O devices. In particular embodiments, external I/O controller 104 is located on a motherboard along with the CPU 102. The external I/O controller 104 may exchange information with components of CPU 102 using point-to-point or other interfaces.

A system memory device 107 may store any suitable data, such as data used by processor 108 to provide the functionality of computer system 100. For example, data associated with programs that are executed or files accessed by cores 114 may be stored in system memory device 107. Thus, a system memory device 107 may include a system memory that stores data and/or sequences of instructions that are executed or otherwise used by the cores 114. In various embodiments, a system memory device 107 may store persistent data (e.g., a user's files or instruction sequences) that maintains its state even after power to the system memory device 107 is removed. A system memory device 107 may be dedicated to a particular CPU 102 or shared with other devices (e.g., one or more other processors or other devices) of computer system 100.

In various embodiments, a system memory device 107 may include a memory comprising any number of memory partitions, a memory device controller, and other supporting logic (not shown). A memory module may include non-volatile memory and/or volatile memory.

Non-volatile memory is a storage medium that does not require power to maintain the state of data stored by the medium. In various embodiments, non-volatile memory may be byte or block addressable. Nonlimiting examples of nonvolatile memory may include any or a combination of: solid state memory (such as planar or 3-dimensional (3D) NAND flash memory or NOR flash memory), 3D crosspoint memory, phase change memory or SXP memory (e.g., memory that uses a chalcogenide glass phase change material in the memory cells), ferroelectric memory, silicon-oxide-nitride-oxide-silicon (SONOS) memory, polymer memory (e.g., ferroelectric polymer memory), ferroelectric transistor random access memory (Fe-TRAM) ovonic memory, anti-ferroelectric memory, nanowire memory, electrically erasable programmable read-only memory (EEPROM), a memristor, single or multi-level phase change memory (PCM), Spin Hall Effect Magnetic RAM (SHE-MRAM), and Spin Transfer Torque Magnetic RAM (STTRAM), a resistive memory, magnetoresistive random access memory (MRAM) memory that incorporates memristor technology, resistive memory including the metal oxide base, the oxygen vacancy base and the conductive bridge Random Access Memory (CB-RAM), a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory.

Volatile memory is a storage medium that requires power to maintain the state of data stored by the medium. Nonlimiting examples of volatile memory may include several types of random access memory (RAM), such as dynamic random access memory (DRAM) or static random access memory (SRAM). One particular type of DRAM that may be used in a memory module is synchronous dynamic random access memory (SDRAM). In some embodiments, any portion of memory 107 that is volatile memory can comply with JEDEC standards including but not limited to Double Data Rate (DDR) standards, e.g., DDR3, 4, and 5, or Low Power DDR4 (LPDDR4) as well as emerging standards.

A storage device 106 may store any suitable data, such as data used by processor 108 to provide functionality of computer system 100. For example, data associated with programs that are executed or files accessed by cores 114A and 114B may be stored in storage device 106. In various embodiments, a storage device 106 may store persistent data (e.g., a user's files or software application code) that maintains its state even after power to the storage device 106 is removed. A storage device 106 may be dedicated to CPU 102 or shared with other devices (e.g., another CPU or other device) of computer system 100.

In the embodiment depicted, storage device 106 includes a storage device controller 118 and four memory chips 116 each comprising four memory partitions 122 operable to store data, however, a storage device may include any suitable number of memory chips each having any suitable number of memory partitions. A memory partition 122 includes a plurality of memory cells operable to store data. The cells of a memory partition 122 may be arranged in any suitable fashion, such as in rows (e.g., wordlines) and columns (e.g., bitlines), three dimensional structures, sectors, or in other ways. In various embodiments, the cells may be logically grouped into banks, blocks, subblocks, wordlines, pages, frames, bytes, slices, or other suitable groups. In various embodiments, a memory partition 122 may include any of the volatile or non-volatile memories listed above or other suitable memory. In a particular embodiment, each memory partition 122 comprises one or more 3D crosspoint memory arrays. 3D crosspoint arrays are described in more detail in connection with the following figures.

In various embodiments, storage device 106 may comprise a solid state drive; a memory card; a Universal Serial Bus (USB) drive; a Non-Volatile Dual In-line Memory Module (NVDIMM); storage integrated within a device such as a smartphone, camera, or media player; or other suitable mass storage device.

In a particular embodiment, one or more memory chips 116 are embodied in a semiconductor package. In various embodiments, a semiconductor package may comprise a casing comprising one or more semiconductor chips (also referred to as dies). A package may also comprise contact pins or leads used to connect to external circuits. In various embodiments, a memory chip may include one or more memory partitions 122.

Accordingly, in some embodiments, storage device 106 may comprise a package that includes a plurality of chips that each include one or more memory partitions 122. However, a storage device 106 may include any suitable arrangement of one or more memory partitions and associated logic in any suitable physical arrangement. For example, memory partitions 122 may be embodied in one or more different physical mediums, such as a circuit board, semiconductor package, semiconductor chip, disk drive, other medium, or any combination thereof.

Storage device 106 may include any suitable interface to communicate with CPU memory controller 112 or I/O controller 110 using any suitable communication protocol such as a DDR-based protocol, PCI, PCIe, USB, SAS, SATA, FC, System Management Bus (SMBus), or other suitable protocol. A storage device 106 may also include a communication interface to communicate with CPU memory controller 112 or I/O controller 110 in accordance with any suitable logical device interface specification such as NVMe, AHCI, or other suitable specification. In particular embodiments, storage device 106 may comprise multiple communication interfaces that each communicate using a separate protocol with CPU memory controller 112 and/or I/O controller 110.

Storage device controller 118 may include logic to receive requests from CPU 102 (e.g., via CPU memory controller 112 or I/O controller 110), cause the requests to be carried out with respect to the memory chips 116, and provide data associated with the requests to CPU 102 (e.g., via CPU memory controller 112 or I/O controller 110). Controller 118 may also be operable to detect and/or correct errors encountered during memory operations via an error correction code (ECC engine). In an embodiment, controller 118 also tracks, e.g., via a wear leveling engine, the number of times particular cells (or logical groupings of cells) have been written to in order to perform wear leveling, detect when cells are nearing an estimated number of times they may be reliably written to, and/or adjust read operations based on the number of times cells have been written to. In performing wear leveling, the storage device controller 118 may evenly spread out write operations among the cells of memory chips 116 in an attempt to equalize the number of operations (e.g., write operations) performed by each cell. In various embodiments, controller 118 may also monitor various characteristics of the storage device 106 such as the temperature or voltage and report associated statistics to the CPU 102. Storage device controller 118 can be implemented on the same circuit board or device as the memory chips 116 or on a different circuit board or device. For example, in some environments, storage device controller 118 may be a centralized storage controller that manages memory operations for multiple different storage devices 106 of computer system 100.

In various embodiments, the storage device 106 also includes program control logic 124 which is operable to control the programming sequence performed when data is written to or read from a memory chip 116. In various embodiments, program control logic 124 may provide the various voltages (or information indicating which voltages should be provided) that are applied to memory cells during the programming and/or reading of data (or perform other operations associated with read or program operations), perform error correction, and perform other suitable functions.

In various embodiments, the program control logic 124 may be integrated on the same chip as the storage device controller 118 or on a different chip. In the depicted embodiment, the program control logic 124 is shown as part of the storage device controller 118, although in various embodiments, all or a portion of the program control logic 124 may be separate from the storage device controller 118 and communicably coupled to the storage device controller 118. For example, all or a portion of the program control logic 124 described herein may be located on a memory chip 116. In various embodiments, reference herein to a "controller" may refer to any suitable control logic, such as storage device controller 118, chip controller 126, or a partition controller. In some embodiments, reference to a controller may contemplate logic distributed on multiple components, such as logic of a storage device controller 118, chip controller 126, and/or a partition controller.

In various embodiments, storage device controller 118 may receive a command from a host device (e.g., CPU 102), determine a target memory chip for the command, and communicate the command to a chip controller 126 of the target memory chip. In some embodiments, the storage device controller 118 may modify the command before sending the command to the chip controller 126.

In various embodiments, the storage device controller 118 may send commands to memory chips 116 to perform host-initiated read operations as well as device-initiated read operations. A host-initiated read operation may be performed in response to reception of a read command from a host coupled to the storage device 106, such as CPU 102. A device-initiated read operation may be a read operation that is performed in response to a device-initiated read command generated by the storage device 106 independent of receiving a read command from the host. In various embodiments, the storage device controller 118 may be the component that generates device-initiated read commands. The storage device 106 may initiate a device-initiated read command for any suitable reason. For example, upon power up of a storage device, the storage device 106 may initiate a plurality of read and write-back commands to re-initialize data of the storage device 106 (e.g., to account for any drift that has occurred while the storage device 106 or a portion thereof was powered off or has sat idle for a long period of time).

The chip controller 126 may receive a command from the storage device controller 118 and determine a target memory partition 122 for the command. The chip controller 126 may then send the command to a controller of the determined memory partition 122. In various embodiments, the chip controller 126 may modify the command before sending the command to the controller of the partition 122.

In some embodiments, all or some of the elements of system 100 are resident on (or coupled to) the same circuit board (e.g., a motherboard). In various embodiments, any suitable partitioning between the elements may exist. For example, the elements depicted in CPU 102 may be located on a single die (i.e., on-chip) or package or any of the elements of CPU 102 may be located off-chip or off-package. Similarly, the elements depicted in storage device 106 may be located on a single chip or on multiple chips. In various embodiments, a storage device 106 and a computing host (e.g., CPU 102) may be located on the same circuit board or on the same device and in other embodiments the storage device 106 and the computing host may be located on different circuit boards or devices.

The components of system 100 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, and a Gunning transceiver logic (GTL) bus. In various embodiments, an integrated I/O subsystem includes point-to-point multiplexing logic between various components of system 100, such as cores 114, one or more CPU memory controllers 112, I/O controller 110, integrated I/O devices, direct memory access (DMA) logic (not shown), etc. In various embodiments, components of computer system 100 may be coupled together through one or more networks comprising any number of intervening network nodes, such as routers, switches, or other computing devices. For example, a computing host (e.g., CPU 102) and the storage device 106 may be communicably coupled through a network.

Although not depicted, system 100 may use a battery and/or power supply outlet connector and associated system to receive power, a display to output data provided by CPU 102, or a network interface allowing the CPU 102 to communicate over a network. In various embodiments, the battery, power supply outlet connector, display, and/or network interface may be communicatively coupled to CPU 102. Other sources of power can be used such as renewable energy (e.g., solar power or motion based power).

Storage device SRAM 130 and chip SRAM 128 each are adapted to execute internal firmware or software of the storage device 106 and memory chip 116 respectively. For example, the logic to be implemented by program control logic 124, upon the issuance of a command, for example from the host or CPU 102 to execute the logic, may be moved from a memory storing the logic to SRAM 130 (such as a NVM—not shown) such that the logic may be executed by the storage device controller 118 which will have access to the logic instructions by way of the associated SRAM 128. Similarly, the logic to be implemented by the chip controller 126, upon the issuance of a command, for example from the host or CPU 102 to execute the logic, may be moved from a memory storage the logic to the associated SRAM 128 (such as a NVM—not shown) such that the logic may be executed by the associated chip controller 126 which will have access to the logic instructions by way of the associated SRAM 128.

Figure 2:
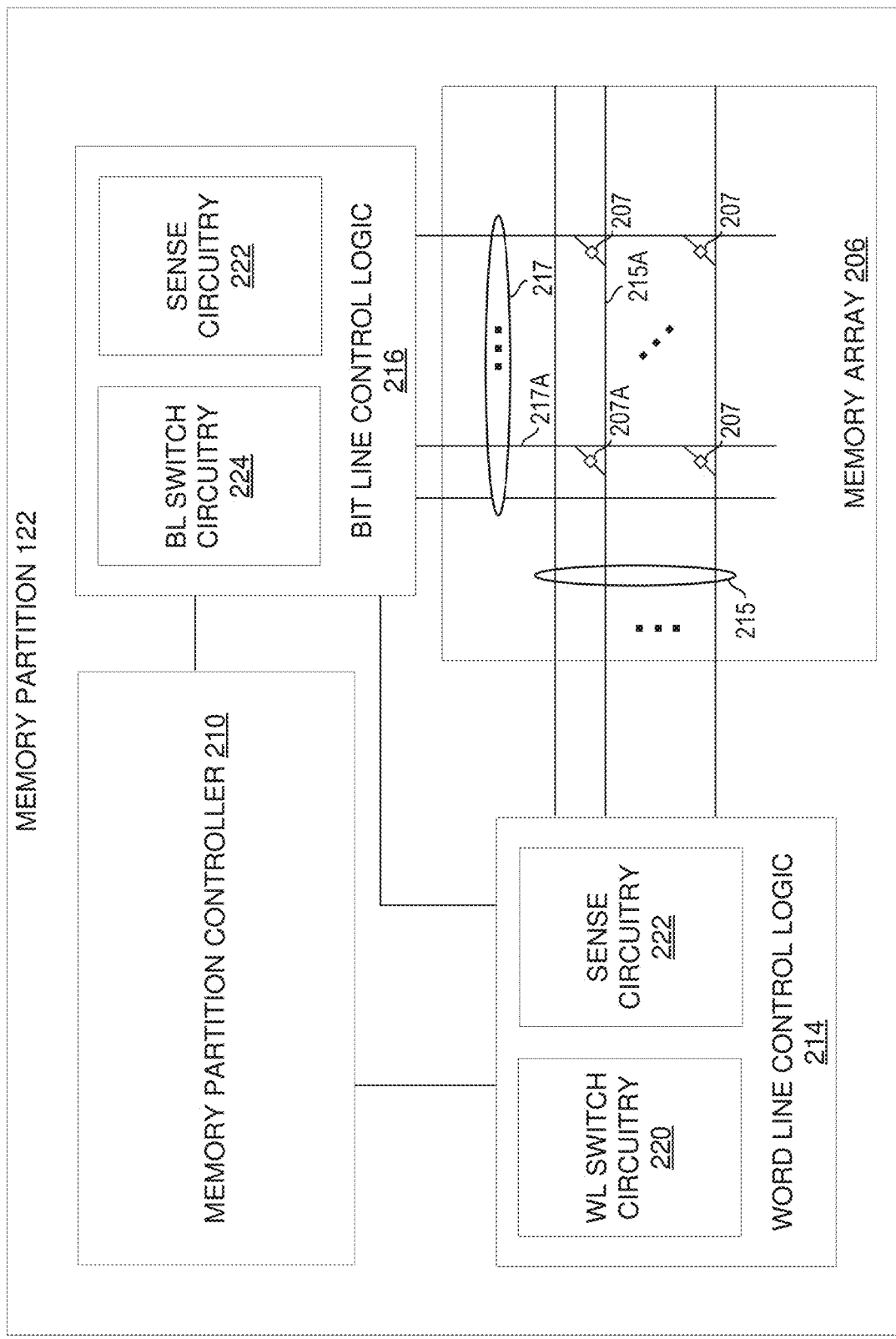
FIG. 2 is a schematic illustration of a memory partition in accordance with certain embodiments.

FIG. 2 illustrates a detailed exemplary view of the memory partition 122 of FIG. 1 in accordance with certain embodiments. In one embodiment, a memory partition 122 may include 3D crosspoint memory which may include phase change memory or other suitable memory types. In a particular embodiment, phase change memory may utilize a chalcogenide material for memory elements. A memory element is a unit of a memory cell that actually stores the information. In operation, phase change memory may store information on the memory element by changing the phase of the memory element between amorphous and crystalline phases. The material of a memory element (e.g., the chalcogenide material) may exhibit either a crystalline or an amorphous phase, exhibiting a low or high conductivity. Generally, the amorphous phase has a low conductivity (high impedance) and is associated with a reset state (logic zero) and the crystalline phase has a high conductivity (low impedance) and is associated with a set state (logic one). The memory element may be included in a memory cell 207 (e.g., a phase change memory cell) that also includes a selector, i.e., a selector device coupled to the memory element. The selector devices are configured to facilitate combining a plurality of memory elements into an array.

In some embodiments, a 3D crosspoint memory array 206 may comprise a transistor-less (i.e., at least with respect to the data storage elements of the memory) stackable crosspoint architecture in which memory cells 207 sit at the intersection of row address lines and column address lines arranged in a grid. The row address lines 215 and column address lines 217, called word lines (WLs) and bit lines (BLs), respectively, cross in the formation of the grid and each memory cell 207 is coupled between a WL and a BL where the WL and BL cross (i.e., crosspoint). At the point of a crossing, the WL and BL may be located at different vertical planes such that the WL crosses over the BL but does not physically touch the BL. As described above, the architecture may be stackable, such that a word line may cross over a bit line located beneath the word line and another bit line for another memory cell located above the word line. It should be noted that row and column are terms of convenience used to provide a qualitative description of the arrangement of WLs and BLs in crosspoint memory. In various embodiments, the cells of the 3D crosspoint memory array may be individually addressable. In some embodiments, bit storage may be based on a change in bulk resistance of a 3D crosspoint memory cell. In various embodiments, 3D crosspoint memory may include any of the characteristics of 3D XPoint memory manufactured by INTEL CORPORATION and/or MICRON TECHNOLOGY, INC.

During a programming operation (i.e., a write operation), the phase of the memory element may be changed by the application of a first bias voltage to the WL and a second bias voltage to the BL resulting in a differential bias voltage across the memory cell that may cause a current to flow in the memory element. The differential bias voltage may be maintained across the memory cell for a time period sufficient to cause the memory element to transition the memory element from the amorphous state to the crystalline state or from the crystalline state to the amorphous state (e.g., via the application of heat produced by an electric current). Snap back is a property of the composite memory element that results in an abrupt change in conductivity and an associated abrupt change in the voltage across the memory element. For example, a "snapback" may be used to refer to an instance where the transition from subthreshold to the threshold or above threshold region of a cell may involve an event where the voltage sustained by the target cell for a given current through the cell is suddenly reduced.

In a read operation, a target memory cell is selected via the application of a first bias voltage to the WL and a second bias voltage to the BL that cross at the target memory cell for a time interval. A resulting differential bias voltage (a demarcation read voltage (VDM)) across the memory element is configured to be greater than a maximum set voltage and less than a minimum reset voltage for the memory element.

In response to application of the VDM, the target memory element may or may not snap back, depending on whether the memory element is in the crystalline state (set) or the amorphous state (reset). Sense circuitry, coupled to the memory element, is configured to detect the presence or absence of snap back in a sensing time interval. The presence of snap back may then be interpreted as a logic one and the absence of snap back as a logic zero.

The differential bias at which a memory cell transitions from being sensed as a logic one (e.g., due to the memory cell snapping back) to being sensed as a logic zero (e.g., due to the memory cell not snapping back), may be termed a threshold voltage (sometimes referred to as a snap back voltage). Thus, when the VDM is higher than the threshold voltage of the memory cell, the memory cell may be sensed as storing a logic one and when the VDM is lower than the threshold voltage of the memory cell, the memory cell may be sensed as storing a logic zero.

In some embodiments, an applied bias such as the VDM of a read pulse may be high enough to only turn on 3D crosspoint cells in the crystalline state, which may have a lower threshold voltage than 3D crosspoint cells in the amorphous state. In some embodiments, the VDM may be supplied through negative and/or positive regulated nodes. For example, the bitline electrode of the 3D crosspoint cell may be a positive regulated node and the wordline electrode coupled to the cell may supply the bias for VDM.

For a write operation or a read operation, one memory cell 207A out of many cells, such as thousands of cells, may be selected as the target cell for the read or write operation, the cell being at the cross section of a BL 217A and a WL 215A. All cells coupled to BL 217A, and all cells coupled to WL 215A other than cell 207A may still see approximately ½ of VDM, with only cell 207A seeing the full VDM.

In the embodiment of FIG. 2, a memory partition 122 includes memory partition controller 210 (or memory controller 210), word line control logic 214, bit line control logic 216, and memory array 206. A host device (e.g., CPU 102) may provide read and/or write commands including memory address(es) and/or associated data to memory partition 122 (e.g., via storage device controller 118 and chip controller 126) and may receive read data from memory partition 122 (e.g., via the chip controller 126 and storage device controller 118). Similarly, storage device controller 118 may provide host-initiated read and write commands or device-initiated read and write commands including memory addresses to memory partition 122 (e.g., via chip controller 126). Memory partition controller 210 (in conjunction with word line control logic 214 and bit line control logic 216) is configured to perform memory access operations, e.g., reading one or more target memory cells and/or writing to one or more target memory cells. Although not depicted, memory partition controller 210 may include an interface to couple the same to the word line control logic (or control circuitry) 214 and bit line control logic (or control circuitry 216).

Memory array 206 corresponds to at least a portion of a 3D crosspoint memory (e.g., that may include phase change memory cells or other suitable memory cells) and includes a plurality of word lines 215, a plurality of bit lines 217 and a plurality of memory cells, e.g., memory cells 207. Each memory cell is coupled between a word line ("WL") and a bit line ("BL") at a crosspoint of the WL and the BL. Each memory cell includes a memory element configured to store information and may include a memory cell selector device (i.e., selector) coupled to the memory element. Selector devices may include ovonic threshold switches, such as those including glassy films (e.g. Ge—Sb—Se—N (GSSN) glassy thin films/chalcogenide glass thin films), diodes, bipolar junction transistors, field-effect transistors, etc. Memory array 206 may be configured to store binary data and may be written to (i.e., programmed) or read from.

Memory partition controller 210 may manage communications with chip controller 126 and/or storage device controller 118. In a particular embodiment, memory partition controller 210 may analyze one or more signals received from another controller to determine whether a command sent via a bus is to be consumed by the memory partition 122. For example, controller 210 may analyze an address of the command and/or a value on an enable signal line to determine whether the command applies to the memory partition 122. Controller 210 may be configured to identify one or more target WLs and/or BLs associated with a received memory address (this memory address may be a separate address from the memory partition address that identifies the memory partition 122, although in some embodiments a portion of an address field of a command may identify the memory partition while another portion of the address field may identify one or more WLs and/or BLs). Memory partition controller 210 may be configured to manage operations of WL control logic 214 and BL control logic 216 based, at least in part, on WL and/or BL identifiers included in a received command.

WL control logic 214 includes WL switch circuitry 220 and sense circuitry 222. WL control logic 214 is configured to receive target WL address(es) from memory partition controller 210 and to select one or more WLs for reading and/or writing operations. For example, WL control logic 214 may be configured to select a target WL by coupling a WL select bias voltage to the target WL. WL control logic 214 may be configured to deselect a WL by decoupling the target WL from the WL select bias voltage and/or by coupling a WL deselect bias voltage to the WL. WL control logic 214 may be coupled to a plurality of WLs 215 included in memory array 206. Each WL may be coupled to a number of memory cells corresponding to a number of BLs 217. WL switch circuitry 220 may include a plurality of switches, each switch configured to couple (or decouple) a respective WL, e.g., WL 215A, to WL select bias voltage to select the respective WL 215A. For example, switch circuitry 220 may include a plurality of transistors.

BL control logic 216 includes BL switch circuitry 224. In some embodiments, BL control logic 216 may also include sense circuitry, e.g., sense circuitry 222. BL control logic 216 is configured to select one or more BLs for reading and/or writing operations. BL control logic 216 may be configured to select a target BL by coupling a BL select bias voltage to the target BL. BL control logic 216 may be configured to deselect a BL by decoupling the target BL from the BL select bias voltage and/or by coupling a BL deselect bias voltage to the BL. BL switch circuitry 224 is similar to WL switch circuitry 220 except BL switch circuitry 224 is configured to couple the BL select bias voltage to a target BL.

Sense circuitry 222 is configured to detect the state of one or more sensed memory cells 207 (e.g., via the presence or absence of a snap back event during a sense interval), e.g., during a read operation. Sense circuitry 222 is configured to provide a logic level output related to the result of the read operation to, e.g., memory partition controller 210. For example, a logic level corresponding to a logic one may be output if the applied VDM is higher than the memory cell's threshold voltage or a logic zero if the applied VDM is lower than the memory cell's threshold voltage. In a particular embodiment, a logic one may be output if a snap back is detected and a logic zero may be output if a snap back is not detected.

As an example, in response to a signal from memory partition controller 210, WL control logic 214 and BL control logic 216 may be configured to select one or more target memory cells, e.g., memory cell 207A, for a read operation by coupling WL 215A to WL select bias voltage and BL 217A to BL select bias voltage. One or both of sense circuitries 222 may then be configured to monitor WL 215A and/or BL 217A for a sensing interval in order to determine the state of the memory cell 207A (e.g., to determine whether or not a snap back event occurs). For example, if a sense circuitry 222 detects a snap back event, then memory cell 207A may be in the set state, but if a sense circuitry 222 does not detect a snap back event in the sensing interval, then memory cell 207A may be in the reset state.

Thus, WL control logic 214 and/or BL control logic 216 may be configured to select a target memory cell for a read operation, initiate the read operation, sense the selected memory cell (e.g., for a snap back event) in a sensing interval, and provide the result of the sensing to, e.g., memory partition controller 210.

In a particular embodiment, the sense circuitry 222 may include a wordline (WL) load connected to a WL electrode or gate, and a bitline (BL) load connected to a bitline electrode or gate. When a particular WL and BL are selected in the array, a difference between WL load or WL voltage and the BL voltage correspond to a read VDM. VDM may induce a current in the memory cell 207A, $I_{cell}$. A comparator such as a sense amplifier may compare $I_{cell}$ with a reference current in order to read a logic state one or logic state zero depending on whether the memory cell is a set cell or a reset cell. The reference current may thus be selected such that the current of the target memory cell is lower than the reference current before snapback of the target memory cell and higher than the reference current after snapback of the target memory cell. In this manner, an output of the sense amplifier/comparator may be indicative of a state of the target memory cell. A latch may be coupled to the output of the comparator to store the output of the read operation. In some embodiments, leakage components of the current can be mitigated by respectively selecting a bias for all other unselected wordlines and bitlines that reduces or minimizes leakage. Capacitive components of the current can be mitigated by allowing sufficient time for the capacitive components to dissipate.

For each matrix of arrays, there may be a sense amplifier provided. Each partition 122 may have 128 such matrices, hence 128 sense amplifiers. Each partition may be read from one read operation.

Figure 3:
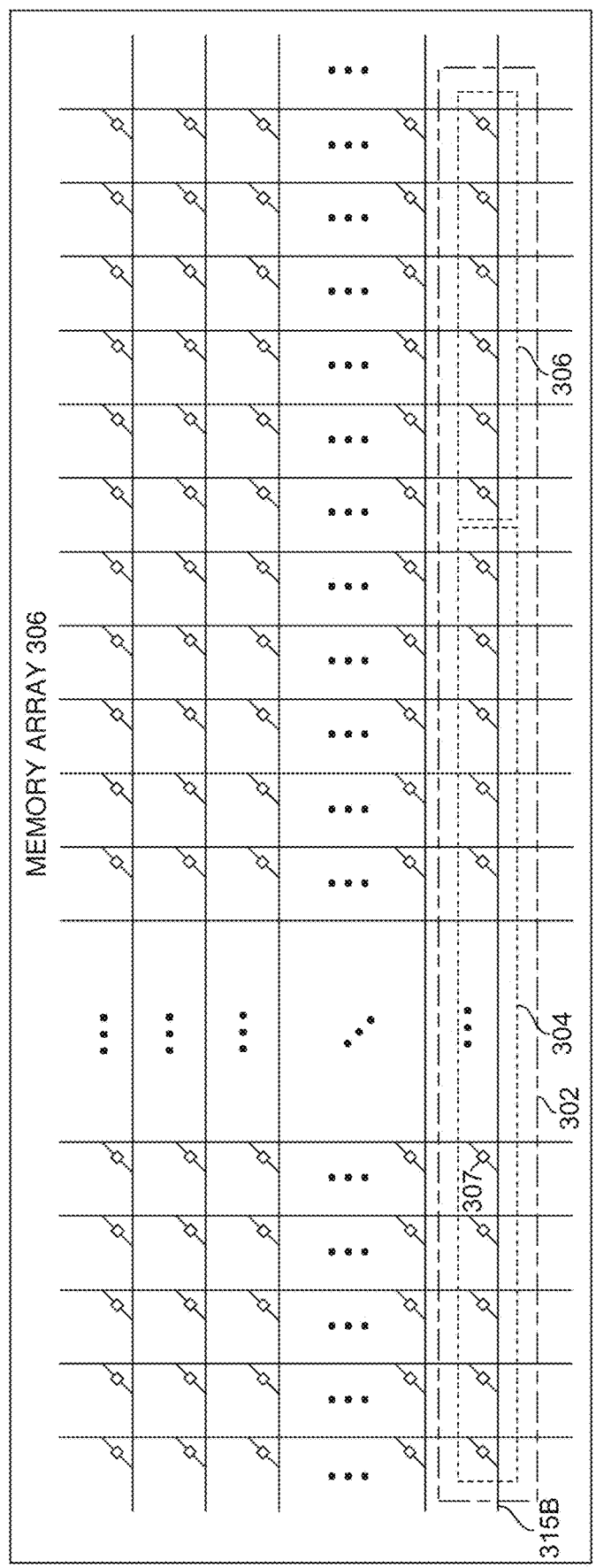
FIG. 3 is a schematic illustration of a memory array in accordance with certain embodiments.

FIG. 3 illustrates a detailed exemplary view of the memory array 206 of FIG. 2 in accordance with certain embodiments. In various embodiments, a plurality of memory cells 207 of memory array 206 may be divided into a logical group such as a slice 302 (and the memory array 206 may include a plurality of slices). In the embodiment depicted, slice 302 includes a plurality of memory cells 207 coupled to the same WL 215A, though a slice 302 may comprise any suitable arrangement of memory cells.

In a particular embodiment, a slice may include a payload portion 304 and a metadata portion 306. The memory cells of the payload portion 304 may store data written to the storage device 106 by a host (e.g., CPU 102/104). For example, the host may send a write command specifying payload data to be written to the storage device 106 at a particular logical address. The payload of the write command may be stored in a payload portion 304 of one or more slices 302 (in various embodiments, the payload portion 304 may be large enough to hold payload data from multiple write commands from the host). In various embodiments, the size of the payload portion of a slice may have any suitable size, such as 1 kibibyte (KiB), 2 KiB, 4 KiB, 8 KiB, or other suitable size.

The memory cells of the metadata portion 306 of a slice 302 may store metadata associated with the payload data stored in the payload portion 304 of the slice 302 or the slice itself. The metadata portion 306 may store any suitable metadata associated with the payload data or slice. For example, the metadata portion 306 may store parity bits and/or cyclic redundancy check (CRC) bits used during error detection and error correction, e.g., by the storage device controller 118. In alternative embodiments, error detection and/or correction may be performed at any suitable level on the storage device 106, such as by the chip controllers 126 or partition controllers 210.

Figure 4A:
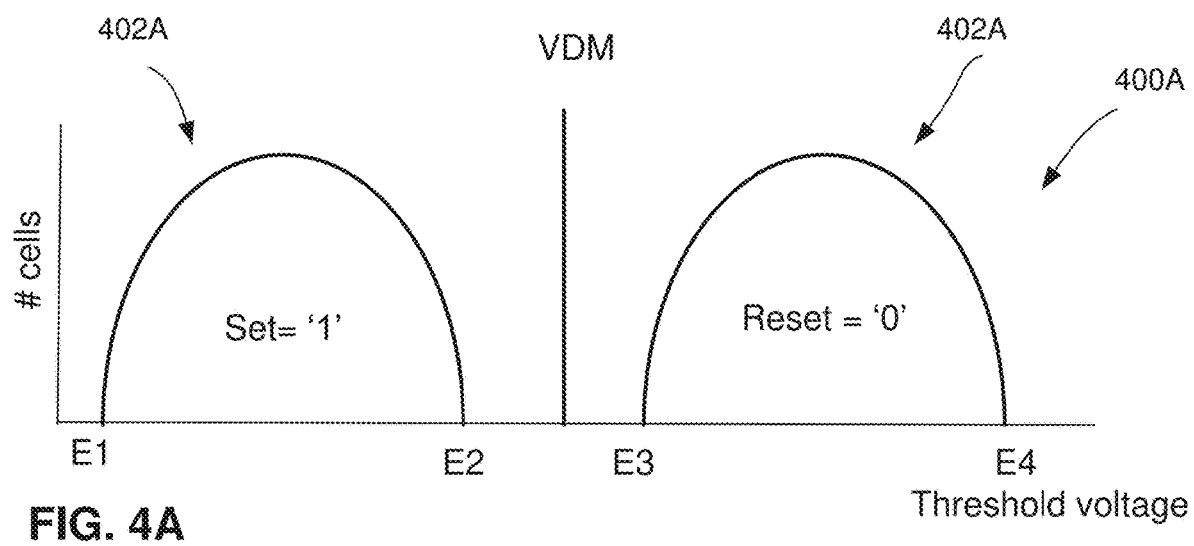
FIG. 4A is a graph depicting memory cell threshold voltage distributions and demarcation voltages in accordance with certain embodiments for a single level cell (SLC) memory including selector devices in individual memory cells thereof.

FIG. 4A illustrates a plot or graph 400A depicting memory cell threshold voltage statistical distributions 402A for set cells (storing a bit 1), and 404A for reset cells (storing a bit 0) (these are meant to represent bell curves for example), and a read voltage "VDM" for a single level cell (SLC) similar to the one shown by way of example in FIG. 5A to be described in further detail below.

In FIG. 4A, the horizontal axis depicts threshold voltages of memory cells of a single level cell array, and the vertical axis depicts bit counts (i.e., number of memory cells). Thus, each point of a distribution 402A/404A represents several cells having a particular threshold voltage. The graph 400A assumes that half of the bits of the array is in a set state (i.e., has a threshold voltage lower than the corresponding VDM) and half of the bits is in a reset state (i.e., has a threshold voltage higher than the corresponding VDM). Distributions 402A and 404A represents a baseline distribution that may correspond to a threshold voltage distribution at a particular point in time.

In a read operation, a target memory cell, such as cell 207A, is selected via the application of a first bias voltage to the WL 215A and a second bias voltage to the BL 217A that cross at the target memory cell for a time interval. A resulting differential bias voltage (a demarcation read voltage (VDM)) across the memory element is configured to be greater than a maximum set voltage E2 and less than a minimum reset voltage E3 for the memory element.

In response to application of the VDM, the target cell may or may not snap back, depending on whether the target cell is in the crystalline state (set) or the amorphous state (reset), as suggested in FIG. 4A. If the target cell is in a set state, application of the VDM would cause the set cell to snap back, in which case the target cell would be read as a logic one, and if the target cell is in a reset state, application of the VDM, ideally, would not cause the reset cell to snap back, in which case the target cell would be read as a logic zero. Sense circuitry, coupled to the memory cell, is configured to detect the presence or absence of snap back in a sensing time interval. The presence of snap back may then be interpreted as a logic one and the absence of snap back as a logic zero as noted above.

The differential bias at which a memory cell transitions from being sensed as a logic one (e.g., due to the memory cell snapping back) to being sensed as a logic zero (e.g., due to the memory cell not snapping back), may be termed a threshold voltage (sometimes referred to as a snap back voltage). Thus, when the VDM is higher than the threshold voltage of the memory cell as shown in FIG. 4A, the memory cell may be sensed as storing a logic one and when the VDM is lower than the threshold voltage of the memory cell, the memory cell may be sensed as storing a logic zero.

In some embodiments, an applied bias such as the VDM of a read pulse may be high enough to only turn on 3D crosspoint cells in the crystalline state, which may have a lower threshold voltage than 3D crosspoint cells in the amorphous state. In some embodiments, the VDM may be supplied through negative and/or positive regulated nodes. For example, the BL electrode of the 3D crosspoint cell may be a positive regulated node and the WL electrode coupled to the cell may supply the bias for VDM and be a negative regulated node.

FIG. 4A is a graph depicting memory cell threshold voltage distributions and demarcation voltages in accordance with certain embodiments for a single level cell (SLC) memory including selector devices in individual memory cells thereof. In FIG. 4A, a VDM applied between E2 and E3 would provide the necessary voltage to read a logic 1 or logic 0 depending on whether the target cell is a set cell or a reset cell.

Figure 4B:
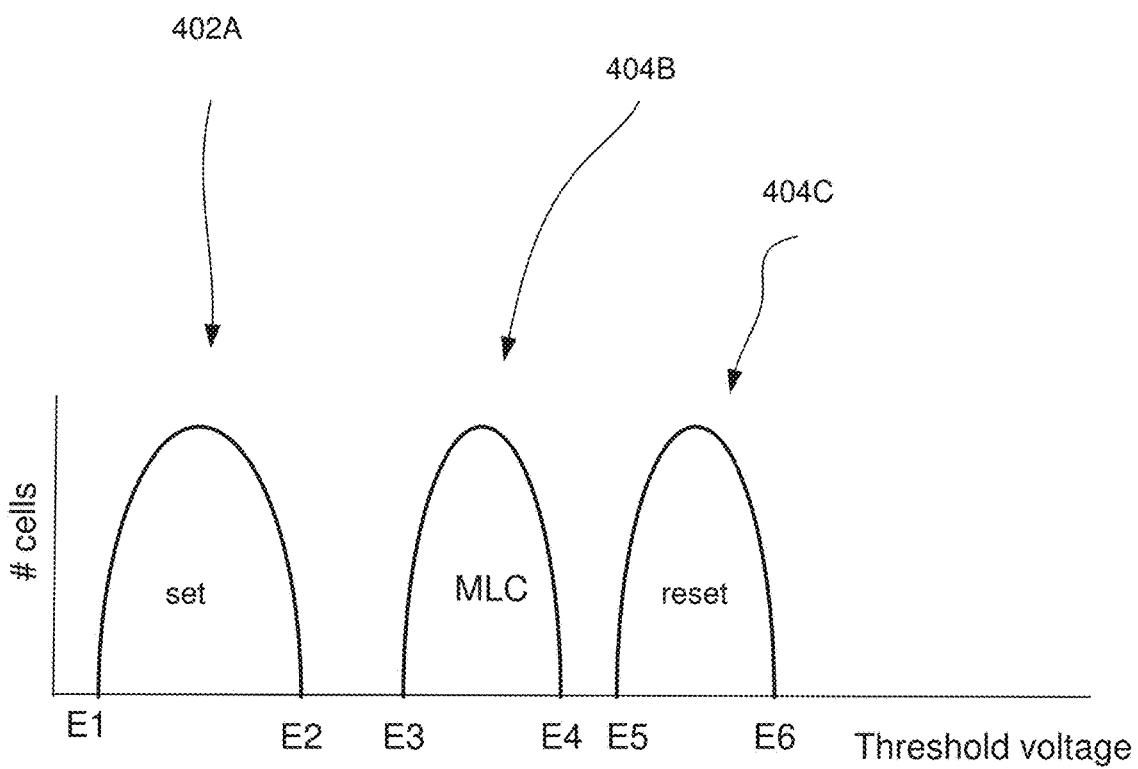
FIG. 4B is a graph depicting memory cell threshold voltage distributions and demarcation voltages in accordance with certain embodiments for a multi-level cell (MLC) memory including selector devices in individual memory cells thereof.

FIG. 4B is a graph depicting memory cell threshold voltage distributions and demarcation voltages in accordance with certain embodiments for a multi-level cell (MLC) memory including selector devices in individual memory cells thereof. By way of example, FIG. 4B shows a graph similar to FIG. 4A but for a three level MLC memory as will be described in further detail in the context of FIG. 5B below, including distributions 402B for cells with a first state (set state), 404B for cells with a second state (MLC state), and 406B for cells with a third state (reset state).

According to some embodiments, a reduction in the current through a selector device of a memory cell ($I_{selector}$) during write set or read setback may be achieved in a number of ways, including by way of example, through changes to BL voltage, changes to WL voltage (such as its absolute value, since the WL voltage is typically negative), or changes to both BL voltage & WL voltage. A goal of $I_{selector}$ ramp down to reach a target memory window of a memory cell (e.g. a memory cell including for example glassy thin films as the selector material, such as chalcogenide based films), is to reduce memory window latency and/or to achieve a higher voltage across the cell in a shorter period of time. Some embodiments may further bring about a reduction in read disturbs.

A cut through a memory cell subjected to a current reduction during write set or read setback, followed by a transmission electron microscopy (TEM) analysis and/or an energy dispersive X-ray analysis (EDX), may be performed to measure a segregation of elements within the selector device of the memory cell, and to estimate the electrothermal Joule heating of the associated selector device using technology computer-aided design (TCAD). High resolution EDX may be used to show whether the selector device exhibits a distinguishable high or low level of element segregation along its thickness orientation, which may be helpful to evaluate use of embodiments, together a microprobe detection analysis to determine current flowing through a local WL or BL node of a memory cell.

Some embodiments use an algorithm that implements a pulse amplitude decrease in $I_{selector}$ during a write operation or a read operation, for example at set or read setback. The algorithm controls current by initially implementing a relatively high current level, e.g. about 50 uA to about 90 uA (where "uA" denotes microAmperes), or current Joule heat close to about 1.7 to about 2 times Tg of the selector material of the memory cell for 10-40 ns post cell snap. The algorithm then may reduce the current through the selector device to a low current level (about 20 to about 40 uA, corresponding to about 1.2 to about 1.4 times Tg of the selector material) through a multi-stage step-down or gradual ramp-down within a given time period corresponding to a latency window (delta t), for example of about 20 to about 100 ns. The latency window corresponds to a time window from the application of a first current pulse to implement a memory operation (such as, for example, in response to a memory operation command from a CPU) until an end of the memory operation where no current pulse is being driven through the cell based on the memory operation. Optionally, the algorithm may hold the low current for an extra time period of about 10 to about 50 ns before cell shutdown at the end of the memory operation.

Embodiments may, by way of example, be implemented in a single selector layer cross-point memory device, or in a MLC memory structure of a cross-point memory device where a selector material including glass, such as a chalcogenide glass, is being used.

The selector device may have a threshold voltage modulated by unipolar programming. When an electric field is applied to across the selector device, one composite element of the selector material may tend to either accumulate or deplete on one end of the selector device (with ends of the selector device being defined in a direction between the BL and the WL corresponding to that selector device) depending on the electronegativity values of that one composite element as compared to other composite elements of the selector material. The above modulates the selector device band structure and carrier injection capability between associated electrodes and the selector material. Experiment and ab-initio simulation has shown that reset state (high Vt) has a moderate material segregation, while set state (low Vt) has enhanced element segregation.

Figure 5A:
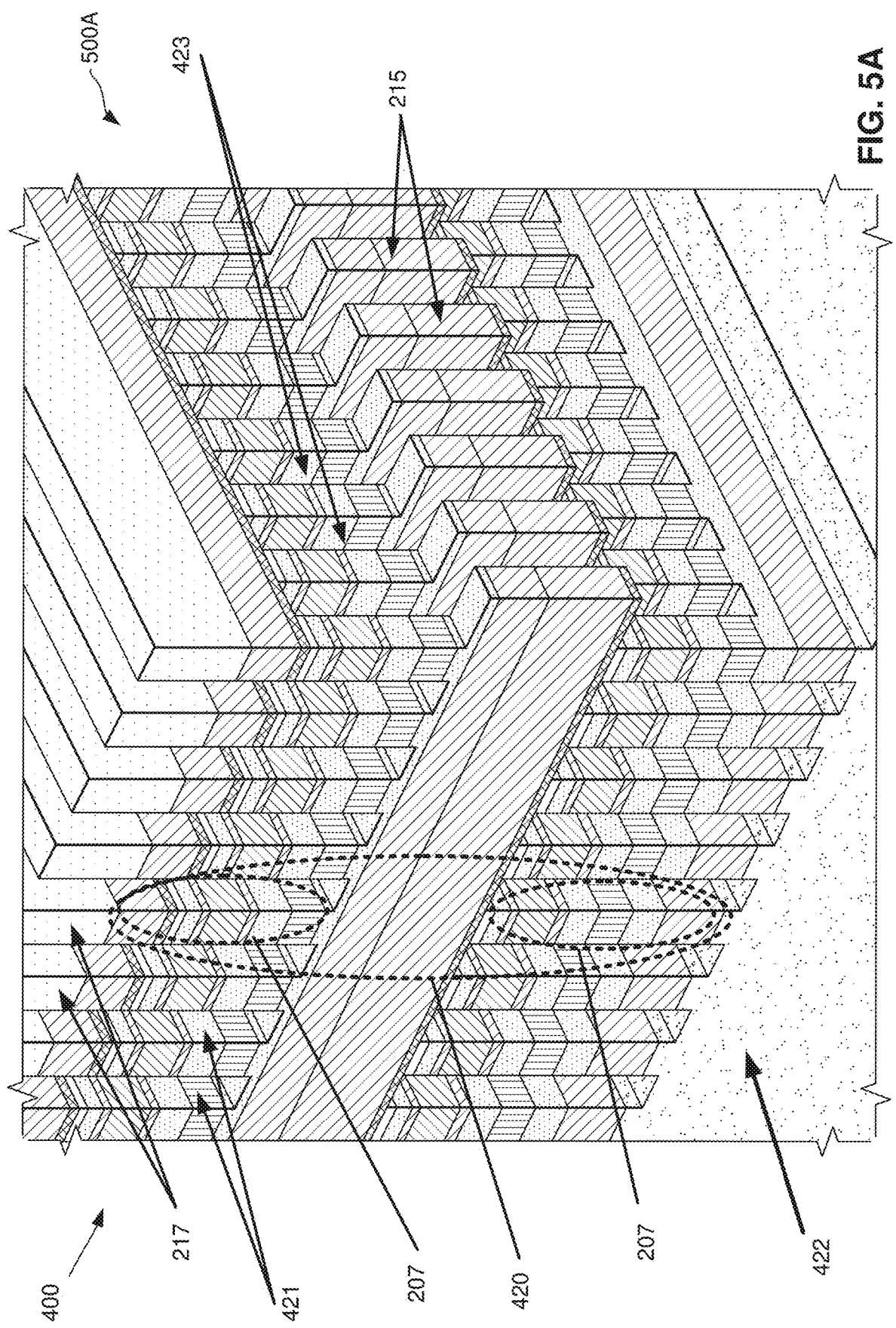
FIG. 5A is a schematic perspective three-dimensional view of a semiconductor structure for a 3D memory architecture according to some embodiments.

FIG. 5A is a schematic perspective three-dimensional view of a semiconductor structure for a 3D memory architecture according to some embodiments. In particular, FIG. 5A is a perspective diagram of an example of a portion of stack 500 of a 3D crosspoint memory device including memory arrays such as those of FIGS. 2 and 3. The specific layers are merely examples and will not be described in detail here. Stack 500 is built on substrate structure 522, such as silicon or another semiconductor. Stack 500 includes multiple pillars 520 as memory cell stacks of memory cells 207. In the diagram of stack 500, it will be observed that the WLs and BLs are orthogonal to each other, and traverse or cross each other in a cross-hatch pattern. A crosspoint memory structure includes at least one memory cell in a stack between layers of BL and WL. As illustrated, wordlines (WL) 215 are in between layers of elements, and bitlines (BL) 217 are located at the top of the circuit. Such a configuration is only an example, and the BL and WL structure can be swapped. Thus, in one representation of stack 500, the WLs can be the metal structures labeled as 217, and the BLs can be the metal structures labeled as 215. More generically, WLs and BLs can be referred to as "address lines", referring to signal lines used to address memory cells. Different architectures can use different numbers of stacks of devices, and different configuration of WLs and BLs. It will be understood that the spaces/trenches 521 running in one direction, and spaces/trenches 523 running in a direction perpendicular to trenches 521, the trenches 521 and 523 being defined between pillars 520, are to be typically filled with an insulator. In one example, stack 500 the BL and WL are made of tungsten metal.

At least some of WLs 215 may correspond to WLs 215 of FIG. 2. At least some of the BLs 217 may correspond to BLs 217 of FIG. 2. Substrate structure 522, such as a silicon substrate, may include control circuitry therein (not shown), such as control circuitry including transistors, row decoders, page buffers, etc. Memory cells 207 may correspond to memory cells 207 of FIG. 2, and may each include a selector device, and/or a memory element and a selector device. The control circuitry of substrate structure 522 may include, for example, a memory partition controller such as memory partition controller 210, BL control logic such as BL control logic 216, and WL control logic such as WL control logic 214 of FIG. 2. Each row of WLs 215 extending in the Y direction, the corresponding cells as coupled to corresponding BLs, would define a memory array, and may correspond to a memory array such as memory array 206 of FIGS. 2 and 3. Some of the WLs and some of the BLs may include dummy WLs or dummy BLs (not shown in FIG. 5A), corresponding to the dummy WLs and dummy BLs in the dummy array 206B of FIGS. 2 and 3.

Figure 5B:
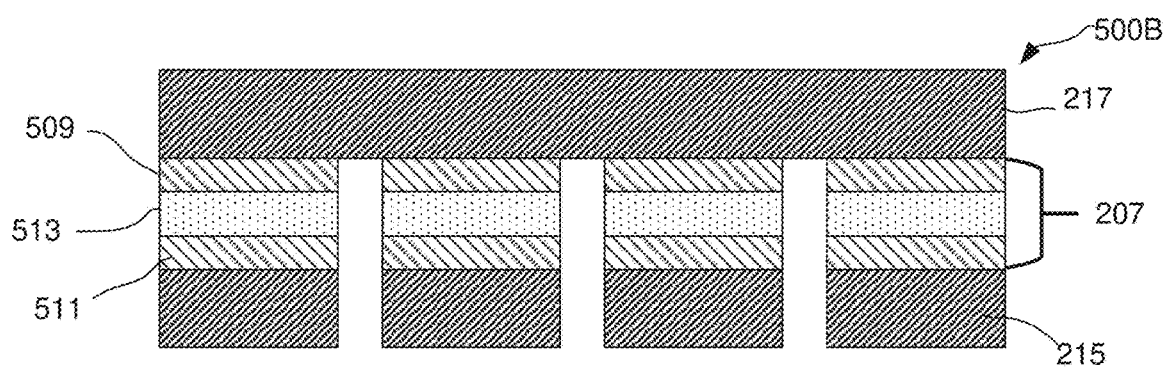
FIGS. 5B and 5C are respective side cross-sectional views of a SLC and a MLC that may be used in the context of embodiments.
Figure 5C:
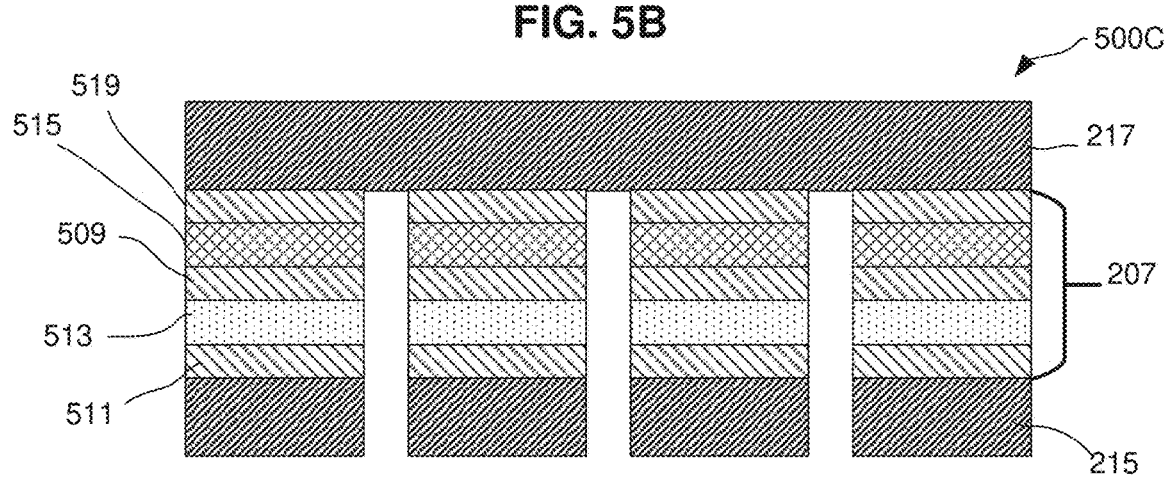

FIGS. 5B and 5C are respective side cross-sectional views of a SLC and a MLC that may be used in the context of embodiments in a 3D memory architecture similar to that in FIG. 5A.

Referring to FIG. 5B, a cross-section is shown of a portion 500B of SLC 3D memory architecture 500A comparable to the architecture of FIG. 5A is shown. In FIG. 5B, the SLC device includes memory cells 207 including a top electrode 509, a bottom electrode 511, and a selector device 513 including a chalcogenide selector device material.

Referring to FIG. 5C, a cross-section is shown of a portion 500C of MLC 3D memory architecture 500A comparable to the architecture of FIG. 5A is shown. In FIG. 5, the MLC device includes memory cells 207 including a top electrode 509, a bottom electrode 511, and a selector device 513 including a chalcogenide selector device material. In FIG. 5C, a memory element 515 including a phase change material (PCM) is further shown as having been provided between top electrode 509 and a topmost electrode 519.

An electrode in each of portions 500B and 500C is electrically coupled to the BL 217 (509 in FIG. 5B and 519 in FIG. 5C), and, in each case, the bottom electrode to WL 215. Controlling a voltage difference between BL 217 and WL 215 would control the current through selector devices 513 of memory cells 207 in the embodiments shown in FIGS. 5B and 5C Reference is now made to FIGS. 6A and 6B, which show respective graphs 600A and 600B, and associated respective data tables 602A and 602B, for two different regimes for a selector device current reduction within a latency window according to two different embodiments, a step-wise reduction algorithm and a ramp-down reduction algorithm, which will be explained in further detail below.

An algorithm according to some embodiments, an example of which is shown in the form of graphs of FIGS. 6A and 6B, suggests implementing a reduction in the current passing through the selector device of a memory cell, which reduction may take place over time during a write or read operation.

An algorithm according to embodiments may enhance the segregation of composite elements in the selector material, as compared with algorithms of the prior art that employ a square pulse to implement a write set, a read set/reset (in the case of a SLC memory device) or a write MLC or read MLC/reset (in the case of a MLC memory device).

As seen in FIG. 6A at graph 600A and at table 602A, a $I_{selector}$ may start at S at a relatively high start value, such as, for example at a value greater than 100 uA. $I_{selector}$ may then be controlled to decrease to point in time P at a value of about 50 to about 75 uA during a period SP of less than about 20 ns. $I_{selector}$ may then be controlled to stay substantially constant between point in time P at a value of about 50 to about 75 uA and point in time A during a step period of about 10 to about 30 ns. $I_{selector}$ may then be controlled to decrease to point in time B at a value of about 35 to about 50 uA during a period AB of less than about 10 ns. $I_{selector}$ may then be controlled to stay substantially constant between point in time B at a value of about 35 to about 50 uA and point in time C during a step period of about 20 to about 40 ns. $I_{selector}$ may then be controlled to decrease to point in time D at a value of about 20 to about 40 uA during a period CD of less than about 10 ns. $I_{selector}$ may then be controlled to stay substantially constant between point in time D at a value of about 20 to about 40 uA and point in time E (End) during a step period of about 20 to about 100 ns. The time between start S and end E corresponds to latency window, a time during which an algorithm of embodiments may be implemented. Delta t or latency window corresponds to a latency time to bring a voltage across a selector device up to the target memory window of a cell based on the state of that cell.

The graph and table of FIG. 6A are merely an example, and variations of the step-wise $I_{selector}$ current decrease are within the realm of embodiments. Preferably, a current decrease according to a step-wise reduction algorithm of an embodiment increases three steps (such as three steps PA, BC and DE) in a time period delta t. Where the operation to be implemented during the latency window corresponds to a read operation for a memory cell of the selector device across which $I_{selector}$ is being reduced, the latency window includes a sense time at a beginning thereof as shown in graphs 600A and 600B.

As seen in FIG. 6B at graph 600B and at table 602B, a $I_{selector}$ may start at S at a relatively high start value, such as, for example at a value greater than 100 uA. $I_{selector}$ may then be controlled to decrease to point in time P at a value of about 75 to about 90 uA during a period SP of less than about 20 ns. $I_{selector}$ may then be controlled to decrease gradually between point in time P at a value of about 75 to about 90 uA and point in time A at a value of about 50 to about 75 uA during a decrease period of about 10 to about 40 ns. $I_{selector}$ may then be controlled to decrease gradually from point in time A to point in time B to a value of about 35 to about 50 uA during a period AB of about 20 to about 50 ns. $I_{selector}$ may then be controlled to decrease gradually between point in time B at a value of about 35 to about 50 uA and point in time C at a value of about 20 to about 40 uA during a decrease period of about 20 to about 50 ns. $I_{selector}$ may then be controlled to remain substantially constant from point in time C to point in time D/E at a value of about 20 to about 40 uA during a period CD/E of about 20 to about 100 ns. The time between start S and end D/E corresponds to delta t, a time during which an algorithm of embodiments may be implemented.

The graphs and tables of FIG. 6A and FIG. 6B are merely an example, and variations of the step-wise or ramp-down $I_{selector}$ current decrease are within the realm of embodiments. Preferably, a current decrease according to a step-wise reduction algorithm (FIG. 6A) of an embodiment increases three steps (such as three steps PA, BC and DE) in a time period corresponding to a latency window. The latency window corresponds to a latency time to bring a voltage across a selector device to the target memory window voltage level, that is, a time window to achieve the target memory window, which is based on the memory cell itself, and which, by way of example, could be between about 300 to about 400 hundred mV. Where the operation to be implemented during a latency window corresponds to a read operation for a memory cell corresponding to the selector device across which $I_{selector}$ is being reduced, latency window includes a sense time at a beginning thereof as shown in graphs 600A and 600B.

It is to be noted that embodiments contemplate: (1) for a latency-sensitive memory application, fixing a desired latency window, and implementing the current pulse reduction such that the needed memory window value is reached to switch a state of the cell (in which case the memory window value reached during that fixed latency window will show a gain as compared with the prior art method, where that same latency window will provide a much lower memory window value, as shown for example in graph 700(c) of FIG. 7); and/or (2) for a given memory window to be reached, implementing the current pulse reduction such that the fixed memory window is reached within a time period latency window (in which case the latency window will show a gain as that fixed memory window value will be reached faster as compared with the prior art method, where that same memory window value will be reached in a much longer latency window).

Figure 7:
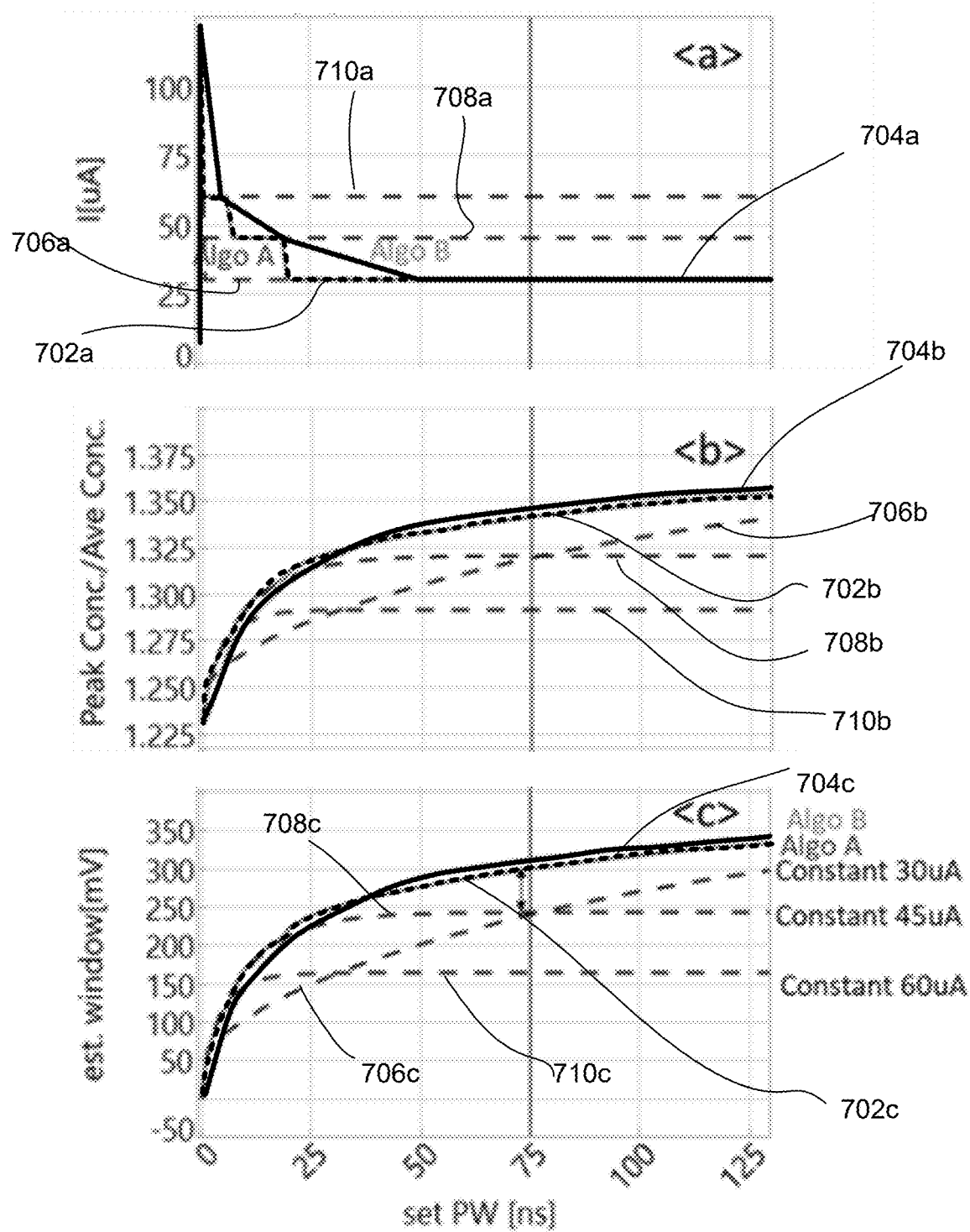
FIG. 7 shows related graphs (a), (b) and (c), where (a) shows superimposed graphs of selector device current against time based on a step-down algorithm and a ramp-down algorithm according to embodiments, and based on square pulse algorithms of the prior art, where (b) shows a ratio of segregation peak concentration over average concentration of a high electronegativity element of the selector material is plotted against time, and where (c) shows superimposed graphs of memory window against time, respective graphs corresponding to those shown in (a).

FIG. 7 shows related graphs (a), (b) and (c), where (a) shows superimposed graphs of selector device current against time based on a step-down algorithm and a ramp-down algorithm according to embodiments, and based on square pulse algorithms of the prior art, where (b) shows a ratio of segregation peak concentration over average concentration of a high electronegativity element of the selector material is plotted against time, and where (c) shows superimposed graphs of memory window against time, respective graphs corresponding to those shown in (a).

In graph 700(a) of FIG. 7, $I_{selector}$ is plotted against time in ns using plot 702a to show a step-wise $I_{selector}$ reduction algorithm according to a first embodiment comparable to that of FIG. 6A. Plot 704a shows a ramp-down $I_{selector}$ reduction algorithm according to a second embodiment comparable to that of FIG. 6B. Plots 706a, 708a and 710a to show $I_{selector}$ according to three different $I_{selector}$ levels (30 uA, 45 uA and 60 uA, respectively) for a square pulse algorithm such as one used in the prior art.

In graph 700(b) of FIG. 7, a ratio of segregation peak concentration over average concentration of a high electronegativity element of the selector material is plotted against time. Segregation peak concentration is plotted against time in ns using plot 702b corresponding to a step-wise $I_{selector}$ reduction algorithm according to a first embodiment comparable to that of FIG. 6A. Plot 704b shows segregation peak concentration corresponding to a ramp-down $I_{selector}$ reduction algorithm according to a second embodiment comparable to that of FIG. 6B. Plots 706b, 708b and 710b show segregation peak concentration against time corresponding to $I_{selector}$ according to three different $I_{selector}$ levels (30 uA, 45 uA and 60 uA, respectively) for a square pulse algorithm such as one used in the prior art.

In graph 700(c) of FIG. 7, an estimated memory window in mV is plotted against time in ns using plot 702c to show a ramp up of memory window over time based on a step-wise $I_{selector}$ reduction algorithm according to a first embodiment comparable to that of FIG. 6A. Plot 704c to show a ramp up of memory window over time based on a ramp-down $I_{selector}$ reduction algorithm according to a second embodiment comparable to that of FIG. 6B, and plots 706c, 708c and 710c show a ramp up of memory window over time based on $I_{selector}$ according to three different $I_{selector}$ levels (30 uA, 45 uA and 60 uA, respectively) for a square pulse algorithm such as one used in the prior art.

Plots 702a-710a of graph 700(a) correlate, respectively, with plots 702b-710b of graph 700(b), and respectively, with plots 702c-710c of graph 700(c).

It can be seen from FIG. 7 that embodiments lead to a faster ramp up of the estimated memory window up to a desired memory window voltage level, for example in the case of FIG. 7 to 300 mV, as compared with any of the square pulse regimes of the prior art. In fact, the higher $I_{selector}$ voltages of 45 uA and 60 uA in a square pulse may never lead to the voltage differential across the memory cell to reach the desired memory window of 300 mV. The lower $I_{selector}$ voltage of 30 uA used in a square pulse according to the prior art, the only one in the shown plot that is seen as reaching the desired memory window voltage level of 300 mV, does so about 50 ns after the slowest one of embodiments, that is, algorithm A, corresponding to the step-wise $I_{selector}$ reduction pulse 702a, and does so over 62 ns after the fastest one of the embodiments, that is, algorithm B, corresponding to the ramp-down $I_{selector}$ reduction pulse 704a.

Referring still to FIG. 7, for the initial 40% of the memory window, a higher pulse amplitude (e.g. about 60 uA corresponding to a Joule heating of about 1.8 times the Tg of the selector material) is most effective to enhance element movement within that material when counter-diffusion is relatively weak. For the next 30% of the memory window, a moderate pulse amplitude (e.g. about 45 uA, corresponding to a Joule heating of about 1.6 times the Tg of the selector material) is shown as having been used, this moderate pulse amplitude level being preferred for the shown example. For the last 30% of the memory window, a low pulse amplitude (e.g. about 30 uA, corresponding to Joule heating of about 1.2 times Tg) is needed to provide a sufficient driving force to achieve a highly segregated state (corresponding to the ratio 1.350 in graph 700(b)) of the high electronegativity elements of the selector material, in which a counter force of thermal diffusion of constituent elements of the selector material is high.

Embodiments, as reflected in FIGS. 6A, 6B and 7, aim to optimize a current pulse amplitude of $I_{selector}$ through various stages of a reduction of $I_{selector}$ as the desired memory window voltage value is reached.

Plot 700(c) of FIG. 7 suggests that embodiments are superior to the best case of square pulse scenario of the prior art at least in terms of latency in reaching the desired memory window voltage value.

Some embodiments provide a read latency and memory window budget advantage. As suggested in FIG. 7, a same memory window of 300 mV requires a current pulse width that is about 1.5 to 2 times less than a current pulse width of the prior art, enabling a better performance in product bandwidth. On the other hand, in latency insensitive applications, with a given pulse width budget, some embodiments increase the memory window by about 15 to about 25%, enabling better margin for yield, and decreasing the likelihood of other failure mechanisms.

In particular, some embodiments provide a read disturb advantage. In a MLC application of embodiments, such as an application of embodiments to a MLC architecture similar to that of FIG. 4B, the PCM layer must stay in an amorphous state during a demarcation read operation between the middle MLC voltage distribution (see e.g. FIG. 4B, MLC voltage distribution 404B) and the reset state (see e.g. FIG. 4B, rest voltage distribution 406B). As seen in FIGS. 6A and 6B, some embodiments use a high current amplitude in stage P to A (e.g. a current amplitude corresponding to A Joule heating to between about 1.8 and 2 times the Tg of the selector material), which helps to shrink sub-critical nuclei sizes inside the PCM while programming the selector device. A cumulation of multiple reads according to some embodiments enables reduction of sub-critical nuclei in every cycle to suppress PM crystallization probability. In contrast, square pulse methods of the prior art keep increasing the sub-critical nuclei, which can eventually grow to stable nuclei and cause read disturbs on the PCM layer.

To effectively arrive to set state (with a relatively high degree of segregation of electronegative elements), both a large electromigration and a large diffusivity. The two metrics in general trend in opposite directions. In an early stage of the set operation, back-diffusion is relatively weak, and the system prefers a higher diffusivity to move elements more effectively. In late stages of the set operation, closer to steady state, larger electromigration force is strongly required counter strong back-diffusion.

An experimental validation of some embodiments has shown that, for a latency window of about 60 ns, the step-down algorithm (for a write or read operation of a set memory cell) involving a stepped pulse going from 75 uA for 40 ns to 30 uA for 20 ns can provides 20% more MLC memory window as compared to a previous solution involving a square pulse at 30 uA for 60 ns).

Embodiments may be implemented in any usage of a memory window based on a chalcogenide selector. One scenario, as noted previously, pertains to single level cell (SLC) cross point memory with selector device only. Algorithms according to embodiments may for example be used to accelerate a threshold voltage reduction process in a write set operation and in a demarcation read operation between set/reset. Algorithms according to embodiments may be implemented in a multiple level cell (MLC) cross point memory with a selector device and phase change memory (PCM). Embodiments when applied to a MLC memory architecture may be used to accelerate a threshold voltage reduction process of a selector device of the MLC memory for example in a write operation at a middle MLC state, and demarcation read operation between a MLC state and a reset state.

Reference is now made to Table 1 below, which pertains to operations to be implemented on a memory cell of a SLC memory architecture with a chalcogenide based selector material of the selector device of the memory cell. The SLC memory architecture may for example be similar to the one shown in FIG. 5A.

Referring to Table 1, when the memory cell is in a set state and a write operation is to be implemented, embodiments envisage implementing either a step-wise or a ramp-down algorithm, for example similar to those described in the context of FIGS. 6A, 6B and 7. The above would be done without a read sense period during the $I_{selector}$ decrease process during a latency window. In response, segregation of electronegative materials in the selector device would be relatively high, as suggested for example in graph 700(b) of FIG. 7, and the threshold voltage would be relatively low.

Referring still to Table 1, when the memory cell is in a reset state and a write operation is to be implemented, embodiments envisage not implementing either a step-wise or a ramp-down algorithm, but implementing a square pulse, for example between about 100 uA and about 150 uA for about 10 to about 50 ns. The above would be done without a read sense period during the $I_{selector}$ decrease process during a latency window. In response, segregation of electronegative materials in the selector device would be relatively low, as suggested for example in graph 700(b) of FIG. 7, and the threshold voltage would be relatively high.

Referring still to Table 1, when the memory cell is in a set state or a reset state and a read operation is to be implemented, embodiments envisage implementing either a step-wise or a ramp-down algorithm, for example similar to those described in the context of FIGS. 6A, 6B and 7. In such a case, for a beginning set state, the cell would first snap, and then use the step-down algorithm or the ramp-down algorithm to implement a setback of the set state. For a beginning reset state on the other hand, the cell would undergo the step-down algorithm or the ramp-down algorithm to implement the read operation without an initial first snap. In either case, a read operation would be done with a read sense period during the $I_{selector}$ decrease process during a latency window.

TABLE 1

| Operation | Selector Device Response | Algorithm |
| --- | --- | --- |
| Write set | Segregation ↑ Vt↓ | Step-wise or ramp-down without read sense |
| Write reset | Segregation ↓ Vt↑ | Square pulse (e.g. about 100 to about 150 uA for about 10 to about 50 ns |
| Read set/reset | If cell in set state: snap and implement a setback to the set state<br>If cell is reset state, no snap | Step-wise or ramp-down with read sense |

Reference is now made to Table 2 below, which pertains to operations to be implemented on a memory cell of a MLC memory architecture with a chalcogenide based selector material of the selector device of the memory cell. The MLC memory architecture may for example be similar to the one shown in FIG. 5B.

Referring to Table 2, when the memory cell is in a set state and a write operation is to be implemented, embodiments envisage implementing a multi-stage set write operation that induces nucleation, growth and setback of the chalcogenide selector material. In response, a state of the PCM material would be crystalline with the resistivity being at a low value. In addition, in response, segregation of electronegative materials in the selector device would be relatively high, as suggested for example in graph 700(b) of FIG. 7, and the threshold voltage would be relatively low. The above would be done without a read sense period.

Referring still to Table 2, when the memory cell is in a reset state and a write operation is to be implemented, embodiments envisage not implementing either a step-wise or a ramp-down algorithm, but implementing a square pulse, for example between about 100 uA and about 150 uA for about 10 to about 50 ns. The above would be done without a read sense period during the $I_{selector}$ decrease process during a latency window. In response, segregation of electronegative materials in the selector device would be relatively low, as suggested for example in graph 700(*b*) of FIG. 7, and the threshold voltage would be relatively high. In addition, in response, a state of the PCM material would be amorphous with a resistivity that is relatively high.

Referring still to Table 2, when the memory cell is in a MLC state and a write operation is to be implemented, embodiments envisage resetting the cell, followed by a delay, such as 20 ns, followed by a step-down algorithm or a ramp-down algorithm according to an embodiment, for example similar to those described in the context of FIGS. 6A, 6B and 7. The above would be done without a read sense period during the $I_{selector}$ decrease process during a latency window. In response, segregation of electronegative materials in the selector device would be relatively high, as suggested for example in graph 700(*b*) of FIG. 7, and the threshold voltage would be relatively low. In addition, in response, a state of the PCM material would be amorphous with a resistivity that is relatively high.

Referring still to Table 2, when the memory cell is in a set state or a MLC state and a read operation is to be implemented, embodiments envisage implementing a multi-stage set read operation with read sense that induces nucleation, growth and setback of the chalcogenide selector material. For a beginning set state, the cell would be caused to undergo a snap and setback disturb to PCM. For a beginning MLC state, there would be not snap to the cell before the read setback to PCM.

Referring still to Table 2, when the memory cell is in a MLC or reset state and a read operation is to be implemented, embodiments envisage implementing a step-down algorithm or a ramp-down algorithm according to an embodiment, for example similar to those described in the context of FIGS. 6A, 6B and 7. The above would be done with a read sense period during the $I_{selector}$ decrease process during a latency window. In response, a state of the PCM material would remain amorphous. For a beginning MLC state, the cell would be caused to undergo a snap and setback disturb to PCM. For a beginning reset state, there would be no snap to the cell before the read setback to PCM.

TABLE 2

| Operation | PCM Response | Selector Device Response | Algorithm |
|---|---|---|---|
| Write set (state 0) | State crystalline ρ↓ | Segregation ↑ Vt↓ | Multi-state set P1-P3-P4 |
| Write reset (state 2) | State amorphous ρ↑ | Segregation ↓ Vt↑ | Square pulse (e.g. up to about 100 to about 150 uA for about 10 to about 50 ns) |
| Write MLC (state 1) | State amorphous ρ↑ | Segregation ↑ Vt↓ | Reset pulse, then wait for a 20 ns delay, and step-wise or ramp-down algorithm without read sense |
| Read set/MLC | If cell in set state: snap and use an algorithm to implement a setback disturb to PCM and SD If cell is in MLC state, no snap | | Multi-state set with read sense at the beginning (nucleation - grow - setback) |
| Read MLC/reset | Remain amorphous | If cell in MLC state, snap and setback to MLC If cell is reset state, no snap | step-wise or ramp-down algorithm without read sense |

Although embodiments have been described in the context of both SLC and MLC memories, they may be also applicable also to triple level cell (TLC) memories, quad level cell (QLC) memories, penta level cell (PLC) memories, or any other memories involving a memory cell array with chalcogenide selector devices as part of its memory cells. In a SLC memory, each memory cell has two voltage levels corresponding to two states (0, 1) to represent one bit. In a MLC, TLC and QLC memory, each memory cell stores two or more bits. Each cell in a MLC memory may use four voltage levels corresponding to four states (00, 01, 10, 11) to represent 2 bits of binary data. Each cell in a TLC memory uses eight voltage levels corresponding to eight states (000 to 111) to represent 3 bits of binary data. Each cell in a QLC memory uses sixteen voltage levels corresponding to sixteen states (0000 to 1111) to represent 4 bits of binary data. In one example, each cell's threshold voltage is indicative of the data that is stored in the cell.

Figure 8:
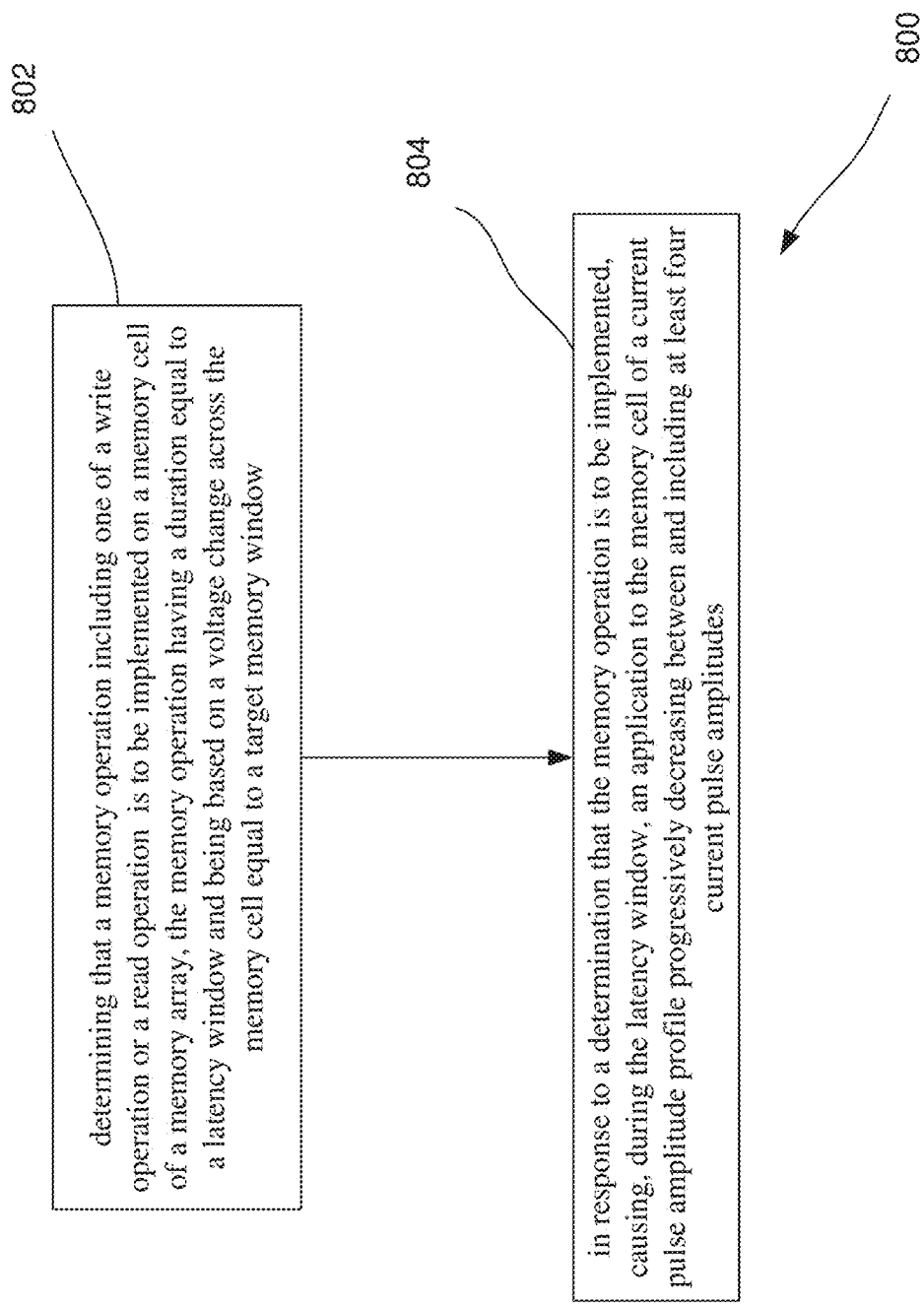
FIG. 8 illustrates an example process in accordance with certain embodiments.

FIG. 8 illustrates an example of a process 800 according to some embodiments. The process includes, at operation 802, the process includes determining that a memory operation including one of a write operation or a read operation is to be implemented on a memory cell of a memory array, the memory operation having a duration equal to a latency window and being based on a voltage change across the memory cell equal to a target memory window; at operation 804, the process includes in response to a determination that the memory operation is to be implemented, causing, during the latency window, an application to the memory cell of a current pulse amplitude profile progressively decreasing between and including at least four current pulse amplitudes.

The flow described in FIG. 8 is merely representative of operations that may occur in particular embodiments. In other embodiments, additional operations may be performed by the components of system 100. Various embodiments of the present disclosure contemplate any suitable signaling mechanisms for accomplishing the functions described herein. Some of the operations illustrated in FIG. 8 may be repeated, combined, modified, or deleted where appropriate. Additionally, operations may be performed in any suitable order without departing from the scope of particular embodiments.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable storage medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Logic may be used to implement any of the functionality of the various components such as CPU 102, external I/O controller 104, processor 108, cores 114A and 114B, I/O controller 110, CPU memory controller 112, storage device 106, system memory device 107, memory chip 116, storage device controller 118, address translation engine 120, memory partition 122, program control logic 124, chip controller 126, memory array 306, memory partition controller 310, word line control logic 314, bit line control logic 316, or other entity or component described herein, or subcomponents of any of these.

"Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a storage device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in storage devices.

Use of the phrase 'to' or 'configured to,' in one embodiment, refers to arranging, putting together, manufacturing, offering to sell, importing, and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware, or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash storage devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage medium used in the transmission of information over the Internet via electrical, optical, acoustical or other forms of propagated signals (e.g., carrier waves, infrared signals, digital signals, etc.). Accordingly, the computer-readable medium includes any type of tangible machine-readable storage medium suitable for storing or transmitting electronic instructions or information in a form readable by a machine (e.g., a computer).

EXAMPLES

Some examples of embodiments are provided below.

Example 1 includes an apparatus including an interface to be coupled to control circuitry for at least one of bitlines (BLs) or wordlines (WLs) of a memory array, and one or more processors coupled to the interface to: determine that a memory operation including one of a write operation or a read operation is to be implemented on a memory cell of the memory array, the memory operation having a duration equal to a latency window and being based on a voltage change across the memory cell equal to a target memory window; and in response to a determination that the memory operation is to be implemented, cause, during the latency window, an application to the memory cell of a current pulse amplitude profile progressively decreasing between and including at least four current pulse amplitudes.

Example 2 includes the subject matter of Example 1, wherein the memory cell includes a selector device comprising a glass material.

Example 3 includes the subject matter of Example 2, wherein the glass material includes a chalcogenide material.

Example 4 includes the subject matter of Example 2, wherein a highest one of the at least four current pulse amplitudes is at a level to cause a Joule heating of the glass material to a value between about 1.7 and about 2 times a glass transition temperature (Tg) of the glass material.

Example 5 includes the subject matter of Example 4, wherein the highest one of the at least four current pulse amplitudes is between about 50 uA to about 90 uA, and a lowest one of the at least four current pulses is between about 20 uA and about 40 uA, and the latency window is between about 20 ns and about 80 ns.

Example 6 includes the subject matter of Example 1, wherein the current pulse amplitude profile progressively decreases during substantially all of the latency window.

Example 7 includes the subject matter of Example 1, wherein the current pulse amplitude profile corresponds to a continuous step-down profile during the latency window, and wherein the at least four current pulse amplitudes correspond to: a first current pulse at a start of the latency window; after a first time period, a second current pulse maintained for a second time period; after a third time period, a third current pulse maintained for a fourth time period; and after a fifth time period, a fourth current pulse maintained for a sixth time period, wherein each one of the second current pulse, the third current pulse and the fourth current pulse is less than a prior corresponding current amplitude.

Example 8 includes the subject matter of Example 7, wherein: the first current pulse is greater than about 100 uA; the second current pulse is between about 50 uA and about 75 uA; the third current pulse is between about 35 uA and about 50 uA; and the fourth current pulse is between about 20 uA and about 40 uA.

Example 9 includes the subject matter of Example 1, wherein the current pulse amplitude profile corresponds to a continuous ramp-down profile during the latency window, and wherein the at least four current pulse amplitudes correspond to: a first current pulse at a start of the latency window; after a first time period, a second current pulse; after a second time period, a third current pulse; and after a third time period, a fourth current pulse, wherein each one of the second current pulse, the third current pulse and the fourth current pulse is less than a prior corresponding current pulse of the at least four current pulse amplitudes.

Example 10 includes the subject matter of Example 9, wherein: the first current pulse is greater than about 100 uA; the second current pulse is between about 75 uA and about 90 uA; the third current pulse is between about 50 uA and about 75 uA; and the fourth current pulse is between about 35 uA and about 50 uA.

Example 11 includes the subject matter of Example 1, wherein the memory cell corresponds to a single level cell (SLC) architecture, and wherein the memory operation consists of at least one of: a write operation on the memory cell when the memory cell is in a set state; or a read operation on the memory cell when the memory cell is between a set state and a reset state.

Example 12 includes the subject matter of Example 11, the one or more processors further to cause application of a square current pulse amplitude profile to the memory cell during a write operation when the memory cell is in a reset state.

Example 13 includes the subject matter of Example 1, wherein the memory cell corresponds to a multi-level cell (MLC) architecture, and wherein the memory operation consists of at least one of: a write operation on the memory cell when the memory cell is in an intermediate state, the intermediate state being between a set state and a reset state; or a read operation on the memory cell when the memory cell is between the intermediate state and the reset state.

Example 14 includes the subject matter of Example 13, wherein, for the write operation when the memory cell is in the intermediate state, the one or more processors are to: cause, at a start of the latency window and during a first time period, application of a reset current pulse to the memory cell; during a second time period, not cause application of a current pulse through the memory cell; and cause, after the second time period, application of the current pulse amplitude profile to the memory cell.

Example 15 includes the subject matter of Example 13, the one or more processors further to cause application of a multi-stage set current pulse amplitude profile to the memory cell during a write operation when the memory cell is in a set state, or during a read operation when the memory cell is between the set state and the intermediate state, wherein the multi-stage set current pulse amplitude profile includes a profile that both decreases and increases during the latency window.

Example 16 includes a system comprising: a memory array including bitlines (BLs) and wordlines (WLs), and a plurality of memory cells coupled between the BLs and the WLs; control circuitry to control the BLs and WLs; and a memory controller including one or more processors coupled to the control circuitry to: determine that a memory operation including one of a write operation or a read operation is to be implemented on a memory cell of the memory array, the memory operation having a duration equal to a latency window and being based on a voltage change across the memory cell equal to a target memory window; and in response to a determination that the memory operation is to be implemented, cause, during the latency window, an application to the memory cell of a current pulse amplitude profile progressively decreasing between and including at least four current pulse amplitudes.

Example 17 includes the subject matter of Example 16, wherein the memory cell includes a selector device comprising a glass material.

Example 18 includes the subject matter of Example 17, wherein the glass material includes a chalcogenide material.

Example 19 includes the subject matter of Example 17, wherein a highest one of the at least four current pulse amplitudes is at a level to cause a Joule heating of the glass material to a value between about 1.7 and about 2 times a glass transition temperature (Tg) of the glass material.

Example 20 includes the subject matter of Example 19, wherein the highest one of the at least four current pulse amplitudes is between about 50 uA to about 90 uA, and a lowest one of the at least four current pulses is between about 20 uA and about 40 uA, and the latency window is between about 20 ns and about 80 ns.

Example 21 includes the subject matter of Example 16, wherein the current pulse amplitude profile progressively decreases during substantially all of the latency window.

Example 22 includes the subject matter of Example 16, wherein the current pulse amplitude profile corresponds to a continuous step-down profile during the latency window, and wherein the at least four current pulse amplitudes correspond to: a first current pulse at a start of the latency window; after a first time period, a second current pulse maintained for a second time period; after a third time period, a third current pulse maintained for a fourth time period; and after a fifth time period, a fourth current pulse maintained for a sixth time period, wherein each one of the second current pulse, the third current pulse and the fourth current pulse is less than a prior corresponding current amplitude.

Example 23 includes the subject matter of Example 22, wherein: the first current pulse is greater than about 100 uA; the second current pulse is between about 50 uA and about 75 uA; the third current pulse is between about 35 uA and about 50 uA; and the fourth current pulse is between about 20 uA and about 40 uA.

Example 24 includes the subject matter of Example 16, wherein the current pulse amplitude profile corresponds to a continuous ramp-down profile during the latency window, and wherein the at least four current pulse amplitudes correspond to: a first current pulse at a start of the latency window; after a first time period, a second current pulse; after a second time period, a third current pulse; and after a third time period, a fourth current pulse, wherein each one of the second current pulse, the third current pulse and the fourth current pulse is less than a prior corresponding current pulse of the at least four current pulse amplitudes.

Example 25 includes the subject matter of Example 24, wherein: the first current pulse is greater than about 100 uA; the second current pulse is between about 75 uA and about 90 uA; the third current pulse is between about 50 uA and about 75 uA; and the fourth current pulse is between about 35 uA and about 50 uA.

Example 26 includes the subject matter of Example 16, wherein the memory cell corresponds to a single level cell (SLC) architecture, and wherein the memory operation consists of at least one of: a write operation on the memory cell when the memory cell is in a set state; or a read operation on the memory cell when the memory cell is between a set state and a reset state.

Example 27 includes the subject matter of Example 26, the one or more processors further to cause application of a square current pulse amplitude profile to the memory cell during a write operation when the memory cell is in a reset state.

Example 28 includes the subject matter of Example 16, wherein the memory cell corresponds to a multi-level cell (MLC) architecture, and wherein the memory operation consists of at least one of: a write operation on the memory cell when the memory cell is in an intermediate state, the intermediate state being between a set state and a reset state; or a read operation on the memory cell when the memory cell is between the intermediate state and the reset state.

Example 29 includes the subject matter of Example 28, wherein, for the write operation when the memory cell is in the intermediate state, the one or more processors are to: cause, at a start of the latency window and during a first time period, application of a reset current pulse to the memory cell; during a second time period, not cause application of a current pulse through the memory cell; and cause, after the second time period, application of the current pulse amplitude profile to the memory cell.

Example 30 includes the subject matter of Example 28, the one or more processors further to cause application of a multi-stage set current pulse amplitude profile to the memory cell during a write operation when the memory cell is in a set state, or during a read operation when the memory cell is between the set state and the intermediate state, wherein the multi-stage set current pulse amplitude profile includes a profile that both decreases and increases during the latency window.

Example 31 includes a non-transitory machine readable storage medium having instructions stored thereon, the instructions when executed by a machine to cause the machine to perform operations including: determining that a memory operation including one of a write operation or a read operation is to be implemented on a memory cell of a memory array, the memory operation having a duration equal to a latency window and being based on a voltage change across the memory cell equal to a target memory window; and in response to a determination that the memory operation is to be implemented, causing, during the latency window, an application to the memory cell of a current pulse amplitude profile progressively decreasing between and including at least four current pulse amplitudes.

Example 32 includes the subject matter of Example 31 wherein the memory cell includes a selector device comprising a glass material.

Example 33 includes the subject matter of Example 32 wherein the glass material includes a chalcogenide material.

Example 34 includes the subject matter of Example 32 wherein a highest one of the at least four current pulse amplitudes is at a level to cause a Joule heating of the glass material to a value between about 1.7 and about 2 times a glass transition temperature (Tg) of the glass material.

Example 35 includes the subject matter of Example 34 wherein the highest one of the at least four current pulse amplitudes is between about 50 uA to about 90 uA, and a lowest one of the at least four current pulses is between about 20 uA and about 40 uA, and the latency window is between about 20 ns and about 80 ns.

Example 36 includes the subject matter of Example 31 wherein the current pulse amplitude profile progressively decreases during substantially all of the latency window.

Example 37 includes the subject matter of Example 31 wherein the current pulse amplitude profile corresponds to a continuous step-down profile during the latency window, and wherein the at least four current pulse amplitudes correspond to: a first current pulse at a start of the latency window; after a first time period, a second current pulse maintained for a second time period; after a third time period, a third current pulse maintained for a fourth time period; and after a fifth time period, a fourth current pulse maintained for a sixth time period, wherein each one of the second current pulse, the third current pulse and the fourth current pulse is less than a prior corresponding current amplitude.

Example 38 includes the subject matter of Example 37 wherein: the first current pulse is greater than about 100 uA; the second current pulse is between about 50 uA and about 75 uA; the third current pulse is between about 35 uA and about 50 uA; and the fourth current pulse is between about 20 uA and about 40 uA.

Example 39 includes the subject matter of Example 31 wherein the current pulse amplitude profile corresponds to a continuous ramp-down profile during the latency window, and wherein the at least four current pulse amplitudes correspond to: a first current pulse at a start of the latency window; after a first time period, a second current pulse; after a second time period, a third current pulse; and after a third time period, a fourth current pulse, wherein each one of the second current pulse, the third current pulse and the fourth current pulse is less than a prior corresponding current pulse of the at least four current pulse amplitudes.

Example 40 includes the subject matter of Example 39 wherein: the first current pulse is greater than about 100 uA; the second current pulse is between about 75 uA and about 90 uA; the third current pulse is between about 50 uA and about 75 uA; and the fourth current pulse is between about 35 uA and about 50 uA.

Example 41 includes the subject matter of Example 31 wherein the memory cell corresponds to a single level cell (SLC) architecture, and wherein the memory operation consists of at least one of: a write operation on the memory cell when the memory cell is in a set state; or a read operation on the memory cell when the memory cell is between a set state and a reset state.

Example 42 includes the subject matter of Example 41, the operations further including causing application of a square current pulse amplitude profile to the memory cell during a write operation when the memory cell is in a reset state.

Example 43 includes the subject matter of Example 31 wherein the memory cell corresponds to a multi-level cell (MLC) architecture, and wherein the memory operation consists of at least one of: a write operation on the memory cell when the memory cell is in an intermediate state, the intermediate state being between a set state and a reset state; or a read operation on the memory cell when the memory cell is between the intermediate state and the reset state.

Example 44 includes the subject matter of Example 43, wherein, for the write operation when the memory cell is in the intermediate state, the operations include: causing, at a start of the latency window and during a first time period, application of a reset current pulse to the memory cell; during a second time period, not causing application of a current pulse through the memory cell; and causing, after the second time period, application of the current pulse amplitude profile to the memory cell.

Example 45 includes the subject matter of Example 43, the operations further including causing application of a multi-stage set current pulse amplitude profile to the memory cell during a write operation when the memory cell is in a set state, or during a read operation when the memory cell is between the set state and the intermediate state, wherein the multi-stage set current pulse amplitude profile includes a profile that both decreases and increases during the latency window.

Example 46 includes a method including: determining that a memory operation including one of a write operation or a read operation is to be implemented on a memory cell of a memory array, the memory operation having a duration equal to a latency window and being based on a voltage change across the memory cell equal to a target memory window; and in response to a determination that the memory operation is to be implemented, causing, during the latency window, an application to the memory cell of a current pulse amplitude profile progressively decreasing between and including at least four current pulse amplitudes.

Example 47 includes the subject matter of Example 46, wherein the memory cell includes a selector device comprising a glass material.

Example 48 includes the subject matter of Example 47, wherein the glass material includes a chalcogenide material.

Example 49 includes the subject matter of Example 47, wherein a highest one of the at least four current pulse amplitudes is at a level to cause a Joule heating of the glass material to a value between about 1.7 and about 2 times a glass transition temperature (Tg) of the glass material.

Example 50 includes the subject matter of Example 49, wherein the highest one of the at least four current pulse amplitudes is between about 50 uA to about 90 uA, and a lowest one of the at least four current pulses is between about 20 uA and about 40 uA, and the latency window is between about 20 ns and about 80 ns.

Example 51 includes the subject matter of Example 46, wherein the current pulse amplitude profile progressively decreases during substantially all of the latency window.

Example 52 includes the subject matter of Example 46, wherein the current pulse amplitude profile corresponds to a continuous step-down profile during the latency window, and wherein the at least four current pulse amplitudes correspond to: a first current pulse at a start of the latency window; after a first time period, a second current pulse maintained for a second time period; after a third time period, a third current pulse maintained for a fourth time period; and after a fifth time period, a fourth current pulse maintained for a sixth time period, wherein each one of the second current pulse, the third current pulse and the fourth current pulse is less than a prior corresponding current amplitude.

Example 53 includes the subject matter of Example 52, wherein: the first current pulse is greater than about 100 uA; the second current pulse is between about 50 uA and about 75 uA; the third current pulse is between about 35 uA and about 50 uA; and the fourth current pulse is between about 20 uA and about 40 uA.

Example 54 includes the subject matter of Example 46, wherein the current pulse amplitude profile corresponds to a continuous ramp-down profile during the latency window, and wherein the at least four current pulse amplitudes correspond to: a first current pulse at a start of the latency window; after a first time period, a second current pulse; after a second time period, a third current pulse; and after a third time period, a fourth current pulse, wherein each one of the second current pulse, the third current pulse and the fourth current pulse is less than a prior corresponding current pulse of the at least four current pulse amplitudes.

Example 55 includes the subject matter of Example 54, wherein: the first current pulse is greater than about 100 uA; the second current pulse is between about 75 uA and about 90 uA; the third current pulse is between about 50 uA and about 75 uA; and the fourth current pulse is between about 35 uA and about 50 uA.

Example 56 includes the subject matter of Example 46, wherein the memory cell corresponds to a single level cell (SLC) architecture, and wherein the memory operation consists of at least one of: a write operation on the memory cell when the memory cell is in a set state; or a read operation on the memory cell when the memory cell is between a set state and a reset state.

Example 57 includes the subject matter of Example 56, the method further including causing application of a square current pulse amplitude profile to the memory cell during a write operation when the memory cell is in a reset state.

Example 58 includes the subject matter of Example 46, wherein the memory cell corresponds to a multi-level cell (MLC) architecture, and wherein the memory operation consists of at least one of: a write operation on the memory cell when the memory cell is in an intermediate state, the intermediate state being between a set state and a reset state; or a read operation on the memory cell when the memory cell is between the intermediate state and the reset state.

Example 59 includes the subject matter of Example 58, wherein, for the write operation when the memory cell is in the intermediate state, wherein the method includes: causing, at a start of the latency window and during a first time period, application of a reset current pulse to the memory cell; during a second time period, not causing application of a current pulse through the memory cell; and causing, after the second time period, application of the current pulse amplitude profile to the memory cell.

Example 60 includes the subject matter of Example 58, the method further including causing application of a multi-stage set current pulse amplitude profile to the memory cell during a write operation when the memory cell is in a set state, or during a read operation when the memory cell is between the set state and the intermediate state, wherein the multi-stage set current pulse amplitude profile includes a profile that both decreases and increases during the latency window.

Example 61 includes an device comprising: one or more processors and one or more computer-readable media comprising instructions that, when executed by the one or more processors, cause the one or more processors to perform the method, techniques, or process as described in or related to any of the Examples above, or portions thereof.

Example 62 includes a signal as described in or related to any of the Examples above, or portions or parts thereof.

Example 63 includes a datagram, packet, frame, segment, protocol data unit (PDU), or message as described in or related to any of the Examples above, or portions or parts thereof, or otherwise described in the present disclosure.

Example 64 includes a signal encoded with data as described in or related to any of the Examples above, or portions or parts thereof, or otherwise described in the present disclosure.

Example 65 includes a signal encoded with a datagram, packet, frame, segment, protocol data unit (PDU), or message as described in or related to any of the Examples above, or portions or parts thereof, or otherwise described in the present disclosure.

Example 66 includes an electromagnetic signal carrying computer-readable instructions, wherein execution of the computer-readable instructions by one or more processors is to cause the one or more processors to perform the method, techniques, or process as described in or related to any of the Examples above, or portions thereof.

Example 67 includes a computer program comprising instructions, wherein execution of the program by a processing element is to cause the processing element to carry out the method, techniques, or process as described in or related to any of the Examples above, or portions thereof.

Example 68 includes means for performing the method according to any one of the Examples methods listed above, or to any other processes according to embodiments.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus including an interface to be coupled to control circuitry for at least one of bitlines (BLs) or wordlines (WLs) of a memory array, and one or more processors coupled to the interface to:
   determine that a memory operation including one of a write operation or a read operation is to be implemented on a memory cell of the memory array, the memory operation having a duration equal to a latency window and being based on a voltage change across the memory cell equal to a target memory window; and
   in response to a determination that the memory operation is to be implemented, cause, during the latency window, an application of a current pulse amplitude profile to the memory cell, wherein the current pulse amplitude profile decreases progressively, encompassing at least four different current pulse amplitudes, the at least four different current pulse amplitudes including a highest current pulse amplitude and a lowest current pulse amplitude.

2. The apparatus of claim 1, wherein the memory cell includes a chalcogenide material.

3. The apparatus of claim 2, wherein the highest current pulse amplitude is at a level to cause a Joule heating of the chalcogenide material to a value between about 1.7 and about 2 times a glass transition temperature (Tg) of the chalcogenide material.

4. The apparatus of claim 3, wherein the highest current pulse amplitude is between about 50 uA to about 90 uA, and the lowest current pulse amplitude is between about 20 uA and about 40 uA, and the latency window is between about 20 ns and about 80 ns.

5. The apparatus of claim 1, wherein the current pulse amplitude profile progressively decreases during substantially all of the latency window.

6. The apparatus of claim 1, wherein the current pulse amplitude profile corresponds to a continuous step-down profile during the latency window, and wherein the at least four different current pulse amplitudes correspond to:
   a first current pulse amplitude at a start of the latency window, the first current pulse amplitude corresponding to the highest current pulse amplitude;
   after a first time period, a second current pulse amplitude maintained for a second time period;
   after a third time period, a third current pulse amplitude maintained for a fourth time period; and
   after a fifth time period, a fourth current pulse amplitude corresponding to the lowest current pulse amplitude, the fourth current pulse amplitude maintained for a sixth time period, wherein each one of the second current pulse amplitude, the third current pulse amplitude and the fourth current pulse amplitude is less than a prior corresponding current pulse amplitude.

7. The apparatus of claim 6, wherein:
   the first current pulse amplitude is greater than about 100 uA;
   the second current pulse amplitude is between about 50 uA and about 75 uA;
   the third current pulse amplitude is between about 35 uA and about 50 uA; and
   the fourth current pulse amplitude is between about 20 uA and about 40 uA.

8. The apparatus of claim 1, wherein the current pulse amplitude profile corresponds to a continuous ramp-down profile during the latency window, and wherein the at least four different current pulse amplitudes correspond to:
   a first current pulse amplitude at a start of the latency window, the first current pulse amplitude corresponding to the highest current pulse amplitude;
   after a first time period, a second current pulse amplitude;
   after a second time period, a third current pulse amplitude; and
   after a third time period, a fourth current pulse amplitude corresponding to the lowest current pulse amplitude, wherein each one of the second current pulse amplitude, the third current pulse amplitude and the fourth current pulse amplitude is less than a prior corresponding current pulse amplitude of the at least four different current pulse amplitudes.

9. The apparatus of claim 8, wherein:
   the first current pulse amplitude is greater than about 100 uA;
   the second current pulse amplitude is between about 75 uA and about 90 uA;
   the third current pulse amplitude is between about 50 uA and about 75 uA; and
   the fourth current pulse amplitude is between about 35 uA and about 50 uA.

10. The apparatus of claim 1, wherein the memory cell corresponds to a single level cell (SLC) architecture, and wherein the memory operation consists of at least one of:
    a write operation on the memory cell when the memory cell is in a set state; or
    a read operation on the memory cell when the memory cell is between a set state and a reset state.

11. The apparatus of claim 1, wherein the memory cell corresponds to a multi-level cell (MLC) architecture, and wherein the memory operation consists of at least one of:
    a write operation on the memory cell when the memory cell is in an intermediate state, the intermediate state being between a set state and a reset state; or
    a read operation on the memory cell when the memory cell is between the intermediate state and the reset state.

12. The apparatus of claim 11, wherein, for the write operation when the memory cell is in the intermediate state, the one or more processors are to:
    cause, at a start of the latency window and during a first time period, application of a reset current pulse to the memory cell;
    during a second time period, not cause application of a current pulse through the memory cell; and
    cause, after the second time period, application of the current pulse amplitude profile to the memory cell.

13. A system comprising:
    a memory array including bitlines (BLs) and wordlines (WLs), and a plurality of memory cells coupled between the BLs and the WLs;
    control circuitry to control the BLs and WLs; and
    a memory controller including one or more processors coupled to the control circuitry to:
        determine that a memory operation including one of a write operation or a read operation is to be implemented on a memory cell of the memory array, the memory operation having a duration equal to a latency window and being based on a voltage change across the memory cell equal to a target memory window, the memory cell including a chalcogenide material; and
        in response to a determination that the memory operation is to be implemented, cause, during the latency window, an application of a current pulse amplitude profile to the memory cell, wherein the current pulse amplitude profile decreases progressively, encompassing at least four different current pulse amplitudes, the at least four different current pulse amplitudes including a highest current pulse amplitude and a lowest current pulse amplitude.

14. The system of claim 13, wherein the highest current pulse amplitude is at a level to cause a Joule heating of the chalcogenide material to a value between about 1.7 and about 2 times a glass transition temperature (Tg) of the chalcogenide material.

15. The system of claim 13, wherein the current pulse amplitude profile progressively decreases during substantially all of the latency window.

16. The system of claim 13, wherein the current pulse amplitude profile corresponds to a continuous step-down profile during the latency window, and wherein the at least four different current pulse amplitudes correspond to:
a first current pulse amplitude at a start of the latency window, the first current pulse amplitude corresponding to the highest current pulse amplitude;
after a first time period, a second current pulse amplitude maintained for a second time period;
after a third time period, a third current pulse amplitude maintained for a fourth time period; and
after a fifth time period, a fourth current pulse amplitude corresponding to the lowest current pulse amplitude, the fourth current pulse amplitude maintained for a sixth time period, wherein each one of the second current pulse amplitude, the third current pulse amplitude and the fourth current pulse amplitude is less than a prior corresponding current pulse amplitude.

17. The system of claim 13, wherein the current pulse amplitude profile corresponds to a continuous ramp-down profile during the latency window, and wherein the at least four different current pulse amplitudes correspond to:
a first current pulse amplitude at a start of the latency window, the first current pulse amplitude corresponding to the highest current pulse amplitude;
after a first time period, a second current pulse amplitude;
after a second time period, a third current pulse amplitude; and
after a third time period, a fourth current pulse amplitude corresponding to the lowest current pulse amplitude, wherein each one of the second current pulse amplitude, the third current pulse amplitude and the fourth current pulse amplitude is less than a prior corresponding current pulse amplitude of the at least four different current pulse amplitudes.

18. A non-transitory machine readable storage medium having instructions stored thereon, the instructions when executed by a machine to cause the machine to perform operations including:
determining that a memory operation including one of a write operation or a read operation is to be implemented on a memory cell of a memory array, the memory operation having a duration equal to a latency window and being based on a voltage change across the memory cell equal to a target memory window, the memory cell including a chalcogenide material; and
in response to a determination that the memory operation is to be implemented, causing, during the latency window, an application of a current pulse amplitude profile to the memory cell, wherein the current pulse amplitude profile decreases progressively, encompassing at least four different current pulse amplitudes, the at least four different current pulse amplitudes including a highest current pulse amplitude and a lowest current pulse amplitude.

19. The storage medium of claim 18, wherein the highest current pulse amplitude is at a level to cause a Joule heating of the chalcogenide material to a value between about 1.7 and about 2 times a glass transition temperature (Tg) of the chalcogenide material.

20. The storage medium of claim 18, wherein the current pulse amplitude profile progressively decreases during substantially all of the latency window.

21. The storage medium of claim 18, wherein the current pulse amplitude profile corresponds to a continuous step-down profile during the latency window, and wherein the at least four different current pulse amplitudes correspond to:
a first current pulse amplitude at a start of the latency window, the first current pulse amplitude corresponding to the highest current pulse amplitude;
after a first time period, a second current pulse amplitude maintained for a second time period;
after a third time period, a third current pulse amplitude maintained for a fourth time period; and
after a fifth time period, a fourth current pulse amplitude corresponding to the lowest current pulse amplitude, the fourth current pulse amplitude maintained for a sixth time period, wherein each one of the second current pulse amplitude, the third current pulse amplitude and the fourth current pulse amplitude is less than a prior corresponding current pulse amplitude.

22. The storage medium of claim 18, wherein the current pulse amplitude profile corresponds to a continuous ramp-down profile during the latency window, and wherein the at least four different current pulse amplitudes correspond to:
a first current pulse amplitude at a start of the latency window, the first current pulse amplitude corresponding to the highest current pulse amplitude;
after a first time period, a second current pulse amplitude;
after a second time period, a third current pulse amplitude; and
after a third time period, a fourth current pulse amplitude corresponding to the lowest current pulse amplitude, wherein each one of the second current pulse amplitude, the third current pulse amplitude and the fourth current pulse amplitude is less than a prior corresponding current pulse amplitude of the at least four different current pulse amplitudes.

23. A method including:
determining that a memory operation including one of a write operation or a read operation is to be implemented on a memory cell of a memory array, the memory operation having a duration equal to a latency window and being based on a voltage change across the memory cell equal to a target memory window; and
in response to a determination that the memory operation is to be implemented, causing, during the latency window, an application of a current pulse amplitude profile to the memory cell, wherein the current pulse amplitude profile decreases progressively, encompassing at least four different current pulse amplitudes, the at least four different current pulse amplitudes including a highest current pulse amplitude and a lowest current pulse amplitude.

24. The method of claim 23, wherein the current pulse amplitude profile corresponds to a continuous step-down profile during the latency window, and wherein the at least four different current pulse amplitudes correspond to:
a first current pulse amplitude at a start of the latency window, the first current pulse amplitude corresponding to the highest current pulse amplitude;

after a first time period, a second current pulse amplitude maintained for a second time period;

after a third time period, a third current pulse amplitude maintained for a fourth time period; and after a fifth time period, a fourth current pulse amplitude corresponding to the lowest current pulse amplitude, the fourth current pulse amplitude maintained for a sixth time period, wherein each one of the second current pulse amplitude, the third current pulse amplitude and the fourth current pulse amplitude is less than a prior corresponding current pulse amplitude.

25. The method of claim 23, wherein the current pulse amplitude profile corresponds to a continuous ramp-down profile during the latency window, and wherein the at least four different current pulse amplitudes correspond to:

a first current pulse amplitude at a start of the latency window, the first current pulse amplitude corresponding to the highest current pulse amplitude;

after a first time period, a second current pulse amplitude;

after a second time period, a third current pulse amplitude; and after a third time period, a fourth current pulse amplitude corresponding to the lowest current pulse amplitude, wherein each one of the second current pulse amplitude, the third current pulse amplitude and the fourth current pulse amplitude is less than a prior corresponding current pulse amplitude of the at least four different current pulse amplitudes.

* * * * *